(12) United States Patent
Kwon

(10) Patent No.: US 8,094,259 B2
(45) Date of Patent: Jan. 10, 2012

(54) LIQUID CRYSTAL DISPLAY WITHOUT COLOR FILTER

(75) Inventor: Jin-Hyuk Kwon, Suseong-gu (KR)

(73) Assignee: Industry-Academic Cooperation Foundation, Yeungnam University, Gyeongsan-si, Gyeongsangbuk-do (KR)

(*) Notice: Subject to any disclaimer, the term of this patent is extended or adjusted under 35 U.S.C. 154(b) by 477 days.

(21) Appl. No.: 12/407,784

(22) Filed: Mar. 19, 2009

(65) Prior Publication Data

US 2009/0262280 A1    Oct. 22, 2009

(30) Foreign Application Priority Data

Apr. 16, 2008  (KR) .................. 10-2008-0035277
Jan. 21, 2009  (KR) .................. 10-2009-0005260

(51) Int. Cl.
*G02F 1/13357* (2006.01)

(52) U.S. Cl. ............... 349/62; 349/95; 349/68; 385/901

(58) Field of Classification Search ............ 349/61, 349/62, 64, 68–70, 84, 95; 362/561, 97.1, 362/97.2, 97.3; 385/901
See application file for complete search history.

(56) References Cited

U.S. PATENT DOCUMENTS

| | | | |
|---|---|---|---|
| 4,798,448 A * | 1/1989 | van Raalte | 349/62 |
| 6,600,528 B2 * | 7/2003 | Colgan et al. | 349/95 |
| 6,714,185 B2 * | 3/2004 | Kim et al. | 345/102 |
| 7,369,725 B2 * | 5/2008 | Takatori et al. | 385/39 |
| 7,715,102 B2 * | 5/2010 | Nakanishi | 359/619 |
| 7,742,123 B2 * | 6/2010 | Jung | 349/62 |
| 7,936,412 B2 * | 5/2011 | Numata et al. | 349/57 |

* cited by examiner

*Primary Examiner* — Sarah Hahm
(74) *Attorney, Agent, or Firm* — Sherr & Vaughn, PLLC

(57) ABSTRACT

Provided is a liquid crystal display (LCD) without a color filter, the LCD including: a liquid crystal panel comprising front and rear glass substrates and a plurality of red, green, and blue liquid crystal subpixels disposed between the front and rear glass substrates corresponding to red, green, and blue lights, respectively; a backlight unit disposed in rear of the liquid crystal panel and comprising a plurality of three-color light supply units supplying the red, green, and blue lights, respectively, and separated from one another so that the plurality of three-color light supply units are compartmentalized; and a lenticular lens array disposed between the liquid crystal panel and the backlight unit, inducing the red, green, and blue lights irradiated by the three-color light supply units into the red, green, and blue liquid crystal subpixels included in the liquid crystal panel and comprising a plurality of lenticular lens groups comprising a plurality of lenticular lenses, wherein the plurality of lenticular lens groups are separated from one another so that the plurality of lenticular lens groups are compartmentalized to correspond to the three-color light supply units, respectively. A lenticular lens array sheet is attached to the liquid crystal panel to remove the color filter in the liquid crystal panel that is the most part of light losses so that light loss can be reduced, power consumption can be reduced and manufacturing costs can be reduced.

20 Claims, 23 Drawing Sheets

(a)

(b)

(c)

LIQUID CRYSTAL DISPLAY WITHOUT COLOR FILTER

CROSS-REFERENCE TO RELATED PATENT APPLICATIONS

This application claims the benefit of Korean Patent Application No. 10-2008-0035277, filed on Apr. 16, 2008 and Korean Patent Application No. 10-2009-0005260, filed on Jan. 21, 2009, in the Korean Intellectual Property Office, the disclosure of which is incorporated hereFin in its entirety by reference.

BACKGROUND OF THE INVENTION

1. Field of the Invention

The present invention relates to a liquid crystal display (LCD), and more particularly, to a direct lighting type LCD without a color filter, in which three-color lights emitted from a plurality of light sources are directly incident on red, green, and blue liquid crystal subpixels sequentially disposed on a liquid crystal panel by using a lenticular lens array without the need of a color filter disposed inside the liquid crystal panel so that a color image having high resolution can be realized without the color filter.

2. Description of the Related Art

FIG. 1 is a cross-sectional view of direct lighting type LCD according to the related art. Referring to FIG. 1, the direct lighting type LCD includes a liquid crystal panel 20 in which a plurality of liquid crystal pixels 23 are disposed to adjust transmittance of light and to act as a light valve, and a backlight unit 10 which illuminates light on the liquid crystal panel 20.

The backlight unit 10 includes an assembly 11 of light sources including a cold cathode fluorescence lamp (CCFL) 11a, an external electrode fluorescence lamp (EEFL), a white light emitting diode (LED) or red (R), green (G), and blue (B) LEDs emitting R, G, and B lights, wherein the assembly 11 of light sources further includes a reflector 11b disposed under each of the light sources, and a plurality of optical sheets from which lights emitted from the light sources are reflected by the reflector 11b or are uniformly mixed and dispersed into a plurality of liquid crystal pixels 23.

Here, R, G, and B are abbreviations of Red, Green, and Blue, and hereinafter, refer to red, green, and blue without any indications.

The optical sheets includes a diffuser plate 12, a diffuser sheet 13, a condensing sheet 14, a reflective polarization sheet 15, and a protection film 16 so as to properly adjust a viewing angle and brightness.

The liquid crystal panel 20 includes a rear glass substrate 22, a front glass substrate 25, the plurality of liquid crystal pixels 23 disposed between the rear glass substrate 22 and the front glass substrate 25, R, G, and B color filters 24 disposed inside the front glass substrate 25, a polarization sheet A 21 attached to the rear glass substrate 22, and a polarization sheet B 26 attached to the front glass substrate 25, wherein these elements are main optical elements. Each of the liquid crystal pixels 23 is comprised of R, G, and B liquid crystal subpixels used to realize R, G, and B images. Each of the R, G, and B color filters 24 is disposed on the front surface of each of the R, G, and B liquid crystal subpixels.

A method of realizing color images in a LCD includes: disposing R, G, and B subpixels used to realize R, G, and B images and included in a liquid crystal pixel which is a minimum unit of a pixel; and disposing each of R, G, and B color filters on the front surface of each of the R, G, and B subpixels so that R, G, and B lights among white light emitted from a backlight can pass through each of the R, G, and B subpixels.

In the LCD, most power of the white light emitted from the backlight unit 10 is lost due to the polarization sheets 21 and 26, the R, G, and B color filters 24, and the aperture ratio of the liquid crystal pixels 23. Only about 5% to 10% of the white light generated from the backlight unit 10 is emitted out of the LCD. Thus, light energy efficiency of the LCD is very low as compared to other flat display displays. Thus, improvements in light energy efficiency of the LCD are conducive to reinforcing a competitive force and to reducing energy consumption of the LCD.

FIG. 2 is a plan view of the structure of each the R, G, and B color filters 24 disposed inside the front glass substrate 25 of the liquid crystal panel 20 illustrated in FIG. 1.

Referring to FIGS. 1 and 2, the plurality of liquid crystal pixels 23 are included in the liquid crystal panel 20 and act as pixels in minimum units that constitute a color image. A liquid crystal pixel 23 is comprised of three, i.e., R, G, and B liquid crystal subpixels that are used to realize R, G, and B images. The R, G, and B color filters 24 through which R, G, and B lights pass are disposed inside the front glass substrate 25 and are disposed on the entire surface of each of the R, G, and B liquid crystal subpixels so as to realize color images.

A black matrix 24d that absorbs light so as to prevent color crosstalk is disposed between the R, G, and B color filters 24a, 24b, and 24c disposed on the front surface of each of the R, G, and B liquid crystal subpixels. The R, G, and B color filters 24 are core elements in producing color images. However, about 30% of the white light when passing through the R, G, and B color filters 24 is transmitted through the R, G, and B color filters 24, and about 70% of the white light is absorbed into the R, G, and B color filters 24 and is lost. Thus, this loss is the most part of losses of light energy that is generated in the LCD.

The loss of light energy of the LCD includes about 50% in the polarization sheets 21 and 26, about 30-50% in the aperture ratio of the liquid crystal pixel 23, and about 70% in the R, G, and B color filters 24. Totally 90% or more light loss occurs and causes high power consumption in the LCD. The R, G, and B color filters 24 are core elements in producing color images but cause much light loss due to absorption.

In order to solve the problem, field sequential color (FSC) technology has been developed to increase light energy efficiency of the LCD. The FSC technology has been devised so as to remove color filters that cause much light energy loss. In the FSC technology, R, G, and B LEDs are used as light sources of a backlight, and display screen image signals are divided into R, G, and B image signals and then, when the R LED is turned on, the R image signal is transmitted to the liquid crystal panel, and when the G LED is turned on, the G image signal is transmitted to the liquid crystal panel, and when the B LED is turned on, the B image signal is sequentially transmitted to the liquid crystal panel at a high speed so that a viewer can see color images.

The FSC LCD technology achieved considerable improvements in technology. However, in the FSC LCD technology, the speed of a circuit for adjusting images should be about 6 times faster as compared to the LCD according to the related art, and flickering and color break-up of moving pictures occur. Thus, it is not easy to put the FSC LCD technology to practical use.

In addition, Yoichi Taira has invented an edge illumination LCD without a color filter, in which light emitted from a CCFL or a RGB LED array is incident into RGB subpixels by using a lenticular lens array and a prism array structure.

However, the edge illumination LCD without the color filter requires a light guide panel and thus, it is not easy to use the technology in a direct lighting type LCD TV that does not include the light guide panel and requires large-scale and high brightness.

SUMMARY OF THE INVENTION

The present invention provides a liquid crystal display (LCD) without a color filter, in which, unlike in the above-described FSC technology, an additional, high-speed driving circuit is not needed at the liquid crystal driving circuit and the image processing circuit. According to the present invention, a liquid crystal panel and driving circuit according to the related art can be used and the said color filter disposed at the liquid crystal panel can be removed so that loss of light energy can be reduced and power consumption of the LCD can be reduced.

The present invention is different from the technology that does not use a color filter in an edge illumination LCD invented by Yoich Taira because the said technology without a color filter requires a light guide panel. The present invention provides an LCD without a color filter, in which a color filter of a LCD is removed by using a compartmentalized light source array and a compartmentalized lenticular lens array so that loss of light energy can be reduced and power consumption of the LCD can be reduced.

According to an aspect of the present invention, there is provided a liquid crystal display (LCD) without a color filter, the LCD including: a liquid crystal panel comprising front and rear glass substrates and a plurality of red, green, and blue liquid crystal subpixels disposed between the front and rear glass substrates and corresponding to red, green, and blue lights, respectively; a backlight unit disposed in rear of the liquid crystal panel and comprising a plurality of three-color light supply units supplying the red, green, and blue lights, and separated from one another so that the plurality of three-color light supply units are compartmentalized; and a lenticular lens array disposed between the liquid crystal panel and the backlight unit, inducing the red, green, and blue lights irradiated by the three-color light supply units into the red, green, and blue liquid crystal subpixels included in the liquid crystal panel and comprising a plurality of lenticular lens groups comprising a plurality of lenticular lenses, wherein the plurality of lenticular lens groups are separated from one another so that the plurality of lenticular lens groups are compartmentalized to correspond to the three-color light supply units, respectively.

The three-color light supply units may include red, green, and blue light emitting diodes (LEDs). The LEDs may be edge emission types and include a plurality of optical waveguides inducing incident lights of the LEDs in a vertical direction due to total internal reflection and converting a current light source type into a linear light source type. The LEDs may further include a circular lens having circular planes or an oval lens having oval planes disposed at a front side of the LEDs. The backlight unit may further include a plurality of blocking walls disposed between the three-color light supply units so as to compartmentalize each of the three-color light supply units.

A separation distance g between the adjacent lenticular lens groups may be determined by Equation $$g = 2T_1 \tan \phi_n,$$

where $T_1$ is a thickness of the rear glass substrate, and $\phi_n$ is the refraction angle at which light incident into the lenticular lens is refracted by the lenticular lens and then proceeds in a vertical, upward direction.

The LCD may further include a diffusion layer interposed between the front glass substrate and the R, G, and B liquid crystal subpixels and used to diffuse incident light. The diffusion layer may be formed of transparent resin in which beads or particles are dispersed. The LCD may further include a optical waveguide grid array in which a plurality of optical waveguide grids extending to an inside of the diffusion layer from a rear side of the front glass substrate are arranged at regular intervals, wherein the optical waveguide grid array guides a portion of the light diffused at the diffusion layer due to internal total reflection. A refractive index of each of the optical waveguide grids may be greater than a refractive index of the diffusion layer.

The three-color light supply units may include red, green, and blue cold cathode fluorescence lamps (CCFLs) or external electrode fluorescence lamps (EEFLs). A reflective layer may be coated at on the rear side of the CCFLs or EEFLs so that lights are emitted from the CCFLs or EEFLs only toward the front direction.

The three-color light supply units may include: three-color light sources supplying red, green, and blue lights by using a plurality of red light sources, a plurality of green light sources, and a plurality of blue light sources; at least three or more light mixers mixing the red, green, and blue lights irradiated by the three-color light sources and generating uniform red, green, and blue lights; at least three or more optical waveguides inducing the red, green, and blue lights generated by the at least three or more light mixers in a vertical direction due to total internal reflection and converting current light source types into linear light source types; and a plurality of optical fibers through which the red, green, and blue lights generated by the light mixers are respectively transmitted to the optical waveguides. The LCD may further include a plurality of prism light split structures disposed at a rear side of the optical waveguides so as to split lights guided inside of the optical waveguides due to total internal reflection toward the vertical direction. The LCD may further include a plurality of concave prism light split structures or inverse prism light split structures disposed on the top sides of the optical waveguides so as to split lights guided inside of the optical waveguides due to total internal reflection in the vertical direction.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
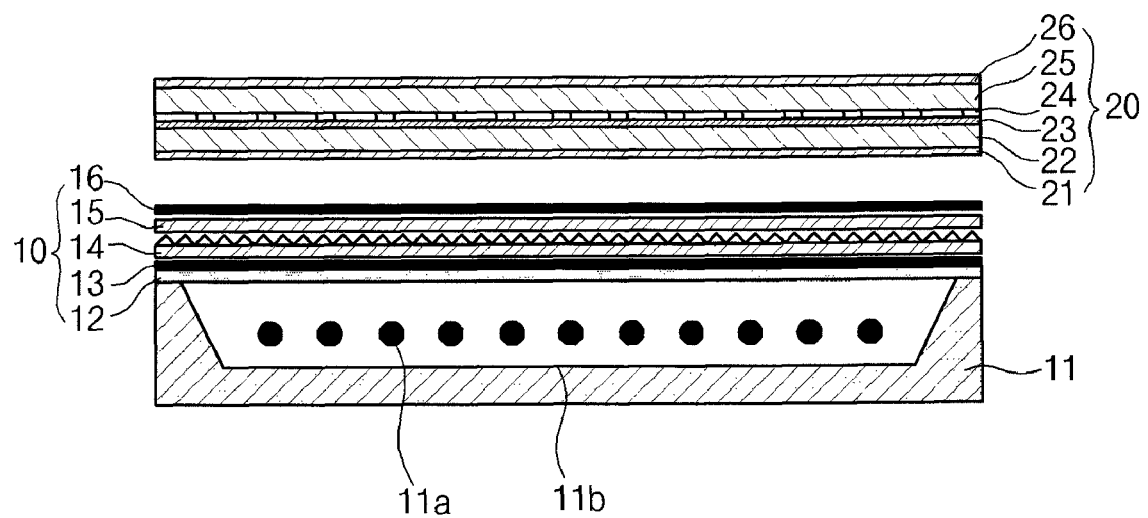
FIG. 1 is a cross-sectional view of a direct lighting type liquid crystal display (LCD) according to the related art.
Figure 2:
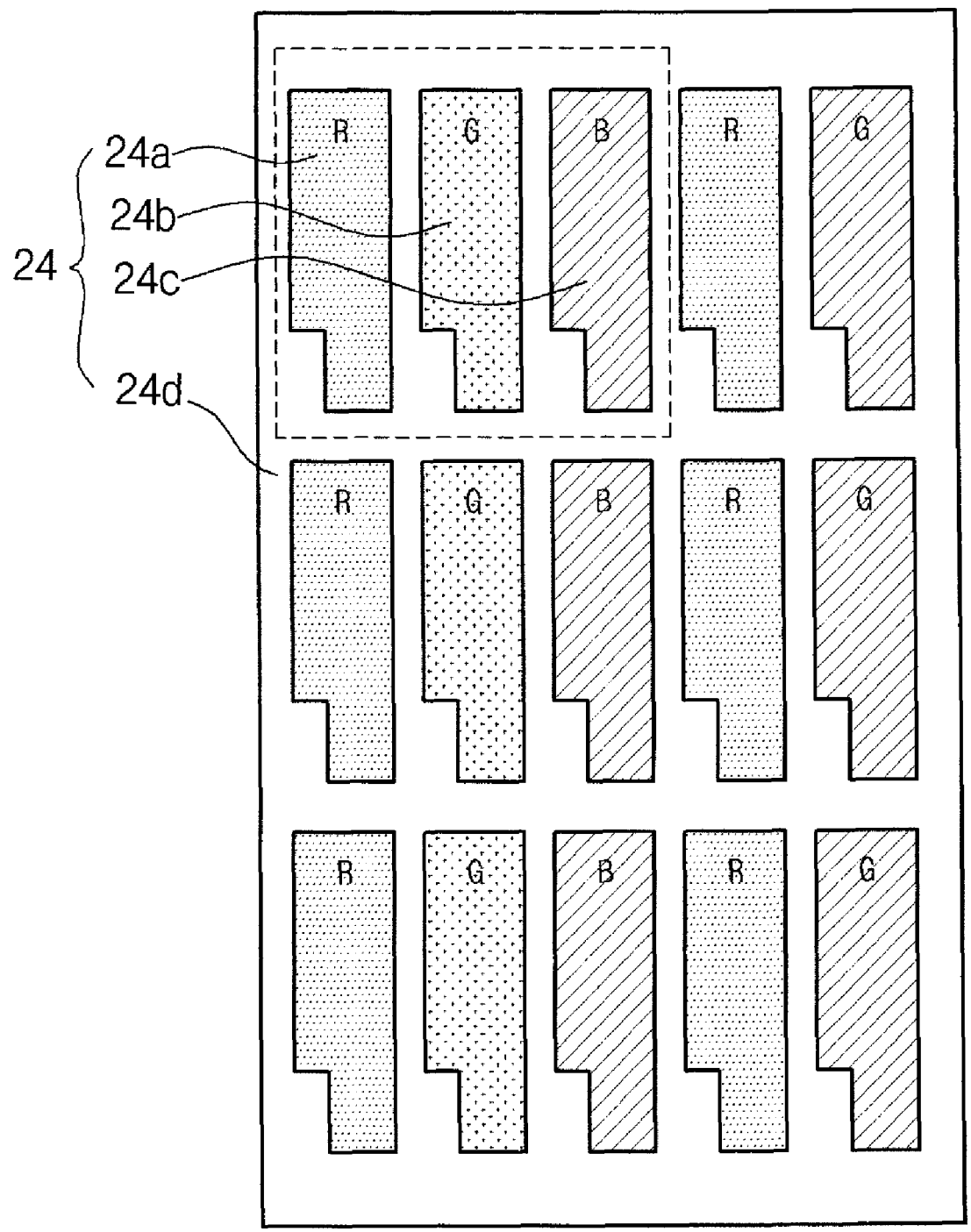
FIG. 2 is a plan view of the structure of each the R, G, and B color filters disposed inside the front glass substrate of the liquid crystal panel illustrated in FIG. 1.

The present invention will now be described more fully with reference to the accompanying drawings, in which exemplary embodiments of the invention are shown. The following embodiments just illustrate the present invention, and the scope of the present invention is not limited to the following embodiments.

Accordingly, the embodiments described in the present specification and the configuration shown in the drawings are just exemplary embodiments of the present invention and do not represent all of the technical spirit of the present invention. Thus, it should be understood that there may be various equivalents and modified examples that can replace the embodiments described in the present specification and the configuration shown in the drawings at the time of filing the present application.

Hereinafter, a liquid crystal display (LCD) without a color filter according to an embodiment of the present invention will be described with reference to FIGS. 3 and 4.

Figure 3:
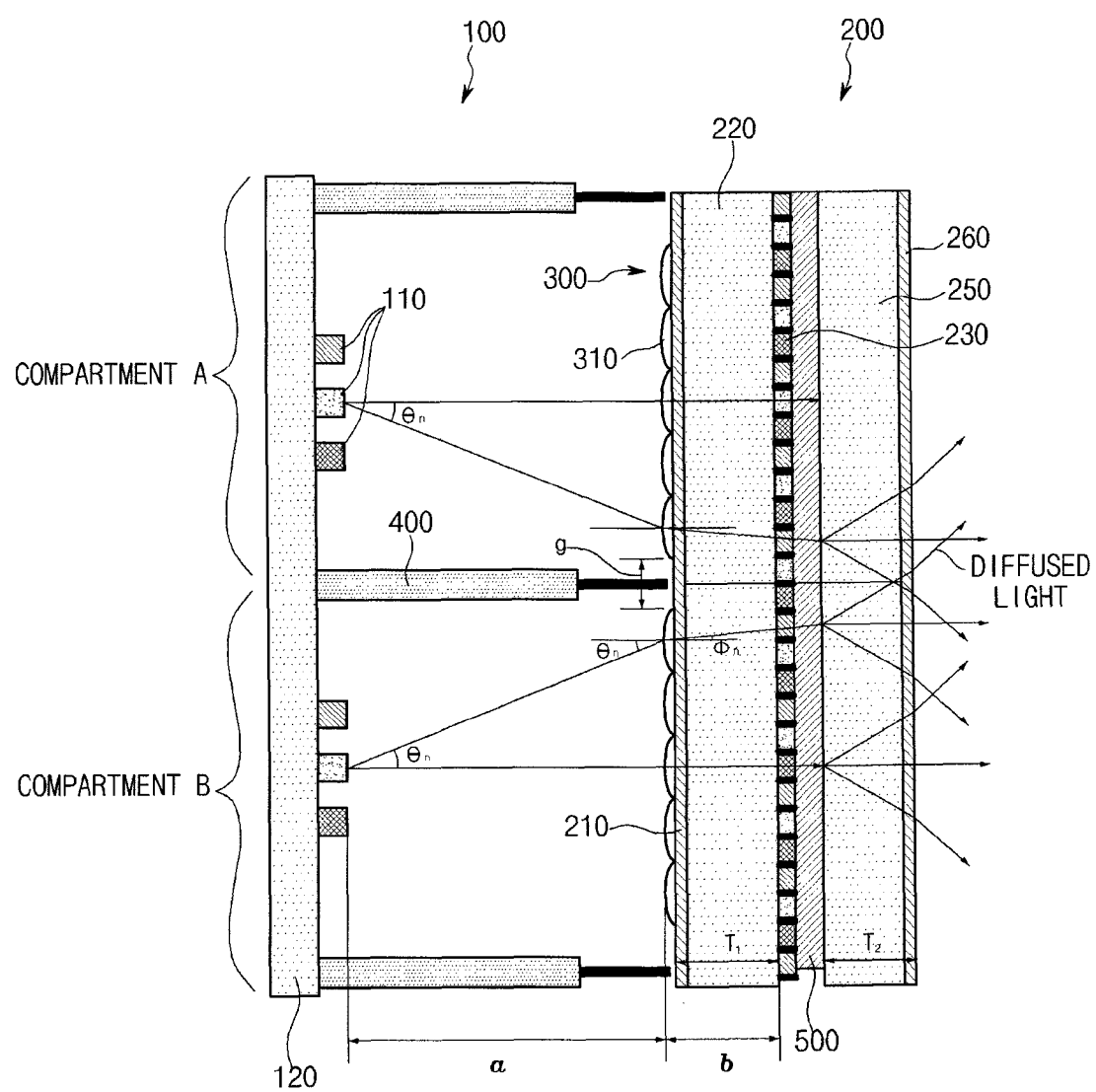
FIG. 3 is a cross-sectional view illustrating a state where a color filter of a liquid crystal panel of an LCD is removed by using a lenticular lens array, according to an embodiment of the present invention.
Figure 4:
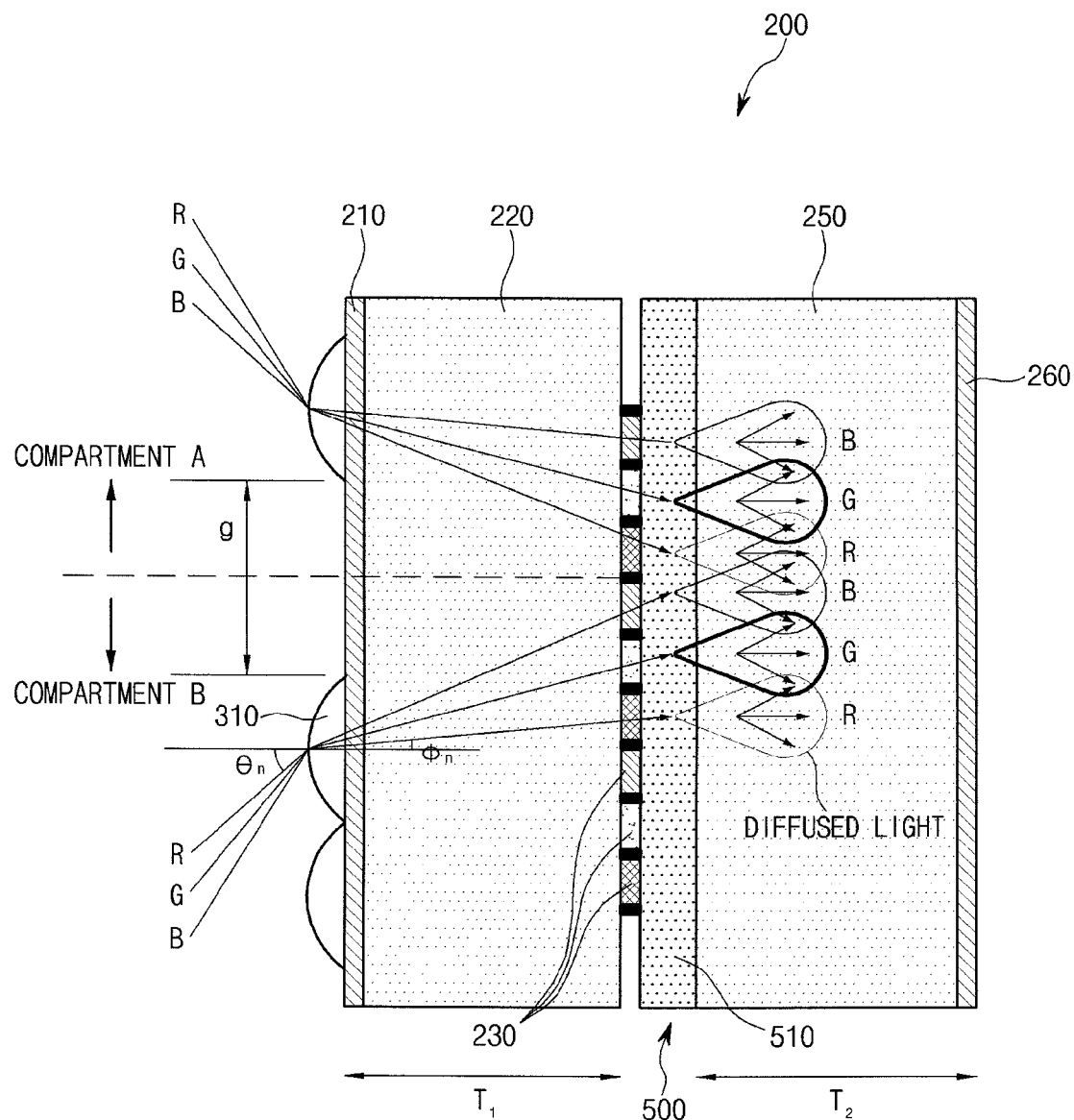
FIG. 4 is a partial expanded view of the liquid crystal panel and the lenticular lens array of FIG. 3.

FIG. 3 is a cross-sectional view illustrating a state where a color filter of a liquid crystal panel of an LCD is removed by using a lenticular lens array, according to an embodiment of the present invention, and FIG. 4 is a partial expanded view of the liquid crystal panel and the lenticular lens array of FIG. 3.

Referring to FIG. 3, the LCD without the color filter includes a backlight unit 100, a liquid crystal panel 200, and a plurality of lenticular lens arrays 300.

The liquid crystal panel 200 includes a plurality of R, G, and B liquid crystal subpixels 230, which are interposed between front and rear glass substrates 250 and 220 and correspond to red (R), green (G), and blue (B) lights, respectively. The backlight unit 100 disposed in rear of the liquid crystal panel 200 includes a plurality of three-color light supply units, which irradiate R, G, and B lights, respectively, and are separated from one another so that the plurality of three-color light supply units can be compartmentalized. The three-color light supply units of the backlight unit 100 are R, G, and B light emitting diodes (LEDs) 110.

In addition, the lenticular lens arrays 300 is disposed between the liquid crystal panel 200 and the backlight unit 100. The lenticular lens array 300 images the R, G, and B lights irradiated by the three-color light supply units on the R, G, and B liquid crystal subpixels 230 included in the liquid crystal panel 200, respectively. Each lenticular lens array 300 includes a plurality of lenticular lens groups including a plurality of lenticular lenses 310, wherein the plurality of lenticular lens groups are separated from one another so that they can be compartmentalized to correspond to each of the three-color light supply units.

The liquid crystal panel 200 includes a rear glass substrate 220, a front glass substrate 250, the plurality of R, G, and B liquid crystal subpixels 230 disposed between the rear glass substrate 220 and the front glass substrate 250, a polarization sheet A 210 attached to the rear glass substrate 220, and a polarization sheet B 260 attached to the front glass substrate 250. A color filter is removed from the liquid crystal panel 200. For your reference, a black matrix (not shown) may be disposed so as to remove color crosstalk between the R, G, and B liquid crystal subpixels 230 and to increase contrast.

The R, G, and B LEDs 110 as the three-color light supply units are divided into a plurality of compartments based on a plurality of blocking walls 400, and lights that belong to different compartments are not mixed in a R, G, and B liquid crystal subpixel 230, and the lenticular lens arrays 300 are disposed according to compartments. Lights emitted from the R, G, and B LEDs 110 included in a compartment (e.g., compartment A) are incident into each of the R, G, and B liquid crystal subpixels 230 that belong to the compartment, due to the plurality of lenticular lenses 310 in the compartment A. In this case, the R, G, and B liquid crystal subpixels 230 are disposed at imaging points of the R, G, and B LEDs 110 due to the lenticular lenses 310. Thus, the R, G, and B lights are dispersed into the plurality of R, G, and B liquid crystal subpixels 230 that are used to display R, G, and B images, and then are imaged. When each lenticular lens array 300 is combined with the polarization sheet A 210 and the rear glass substrate 220, in terms of the relationship between a distance a between each LED 110 and each lenticular lens array 300, and a distance b between each lenticular lens array 300 and each liquid crystal subpixel 230, and a focal distance f of each lenticular lens 310, the following Equation can be established as a formula that is used to express imaging of a lens $$\frac{1}{a} + \frac{n}{b} = \frac{n}{f}, \quad (1)$$

where n is an average refractive index of the lenticular lens 310, the polarization sheet A 210, and the rear glass substrate 220. Magnification that is formed due to the lenticular lens 310 is M'=n*M=n*a/b.

When light is irradiated by the LEDs 110 on the plurality of lenticular lenses 310 by using compartments, inclined angles at which lights proceeds may vary for each lenticular lens. As specific examples, G-light positioned at the center of the R, G, and B LEDs 110 that belongs to the compartment A is incident with inclined angle of $\theta_n$, into the lenticular lens 310 that is placed at the lower edge of the compartment A, and then proceeds downwards at an angle of $\phi_n$ after the G-light is refracted by the lenticular lens 310 and then is incident on a G liquid crystal subpixel that is placed at an lower edge of the compartment A. In addition, in a compartment B that is neighbor on the compartment A, light emitted from the G light source placed in the center of the R, G, and B LEDs 110 is incident with an inclined angle of $\theta_n$ into the lenticular lens 310 that is placed at the upper edge of the compartment B, and is refracted by the lenticular lens 310, and then proceeds upwards at an angle of $\phi_n$ and then is incident on the G liquid crystal subpixel that is placed at the upper edge of the compartment B. The relationship between $\theta_n$ and $\phi_n$ is sin $\theta_n$=n sin $\phi_n$ according to the Law of Snell. Here, n is a refractive index of the lenticular lens 310. Since the R, G, and B liquid crystal subpixels 230 are disposed at equivalent distances, the lenticular lenses 310 that are adjacent to one another at the edges of the neighboring compartments may be separated from one another by g=2$T_1$ tan $\phi_n$. The blocking walls 400 may be disposed at the separation distance g. Here, $T_1$ is the thickness of the rear glass substrate 220, and $\phi_n$ is the refraction angle at which light incident into the lenticular lens 310 is refracted by the lenticular lens 310.

Referring to FIG. 3, when lights emitted from the R, G, and B LEDs 110 placed in a compartment are incident into the plurality of lenticular lenses 310 and then are incident into the R, G, and B liquid crystal subpixels 230, the proceeding directions of the lights that are incident into the respective R, G, and B liquid crystal subpixels 230 that belong to different compartments are different from each other so that a difference between brightness and color occurs according to viewing angles. In addition, the light that proceeds to be inclined in a vertical direction at the edges adjacent to the neighboring compartments (e.g., compartments A and B) passes through the R, G, and B subpixels 230 that belong to each of the compartments A and B, proceeds in crossing directions, causes color crosstalk of images and causes lowering of an image quality.

In order to solve the problems, a diffusion layer 500 is disposed inside the front glass substrate 250, as illustrated in FIG. 4. The three-color R, G, and B lights that pass through the R, G, and B liquid crystal subpixels 230 due to the diffusion layer 500 are emitted in parallel regardless of incidence angles, are diffused upwards and downwards and from side to side so that a sufficient viewing angle is provided to a viewer and a color difference or brightness change is minimized according to viewing angles. To this end, a particle-dispersing diffusion layer 500 in which a plurality of transparent beads or a plurality of fine particles 510 having different refractive index from the refractive index of transparent resin may be used, as illustrated in FIG. 4. A transparent indium tin oxide (ITO) electrode is disposed on the surface of the particle-dispersion diffusion layer 500 that contacts the R, G, and B liquid crystal subpixels 230 so that electrical signals can be applied to liquid crystal subpixels.

Hereinafter, an LCD without a color filter according to the second embodiment of the present invention will be described with reference to FIGS. 5 through 7.

Figure 5:
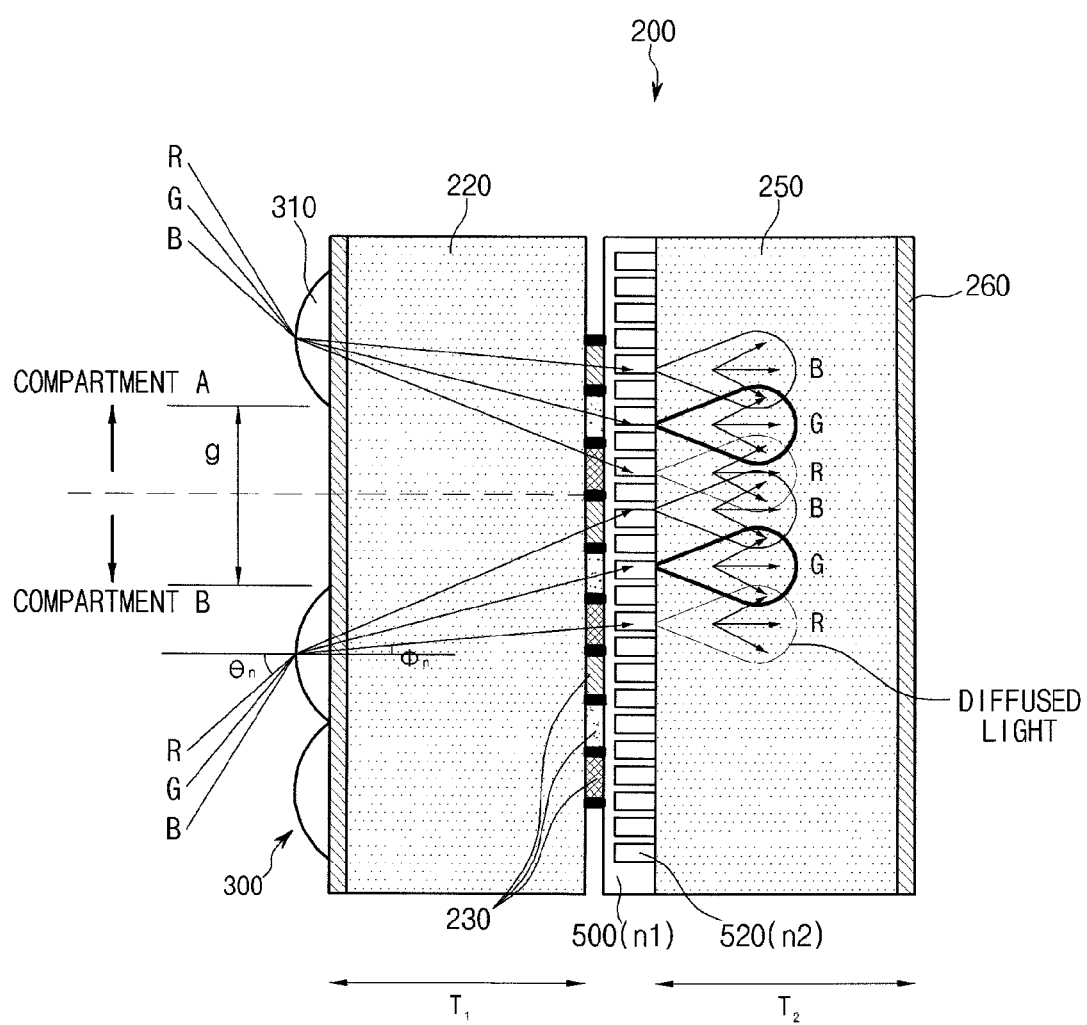
FIG. 5 is a cross-sectional view illustrating a state where a color filter of a liquid crystal panel of an LCD is removed by using the lenticular lens array, according to another embodiment of the present invention.
Figure 6:
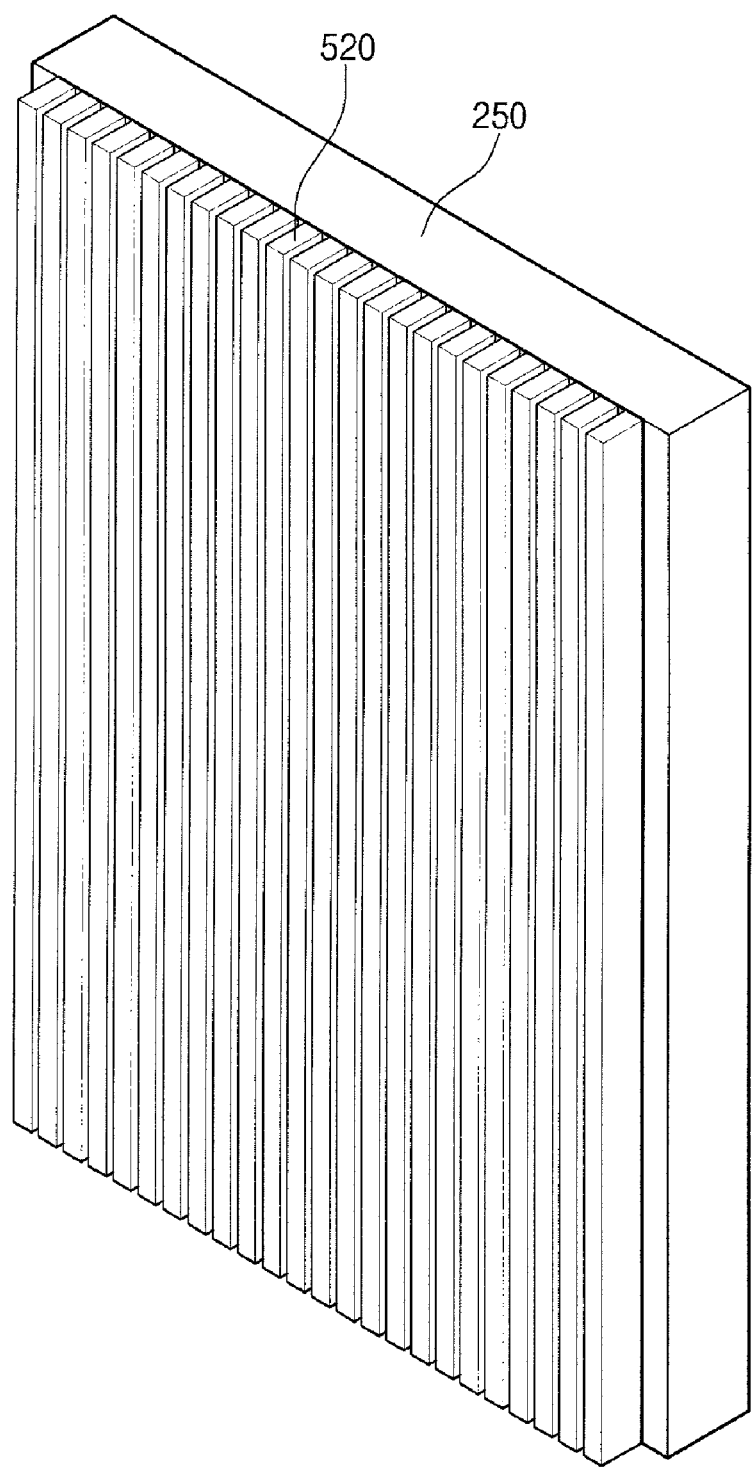
FIG. 6 is a perspective view of an optical waveguide grid array of FIG. 5.
Figure 7:
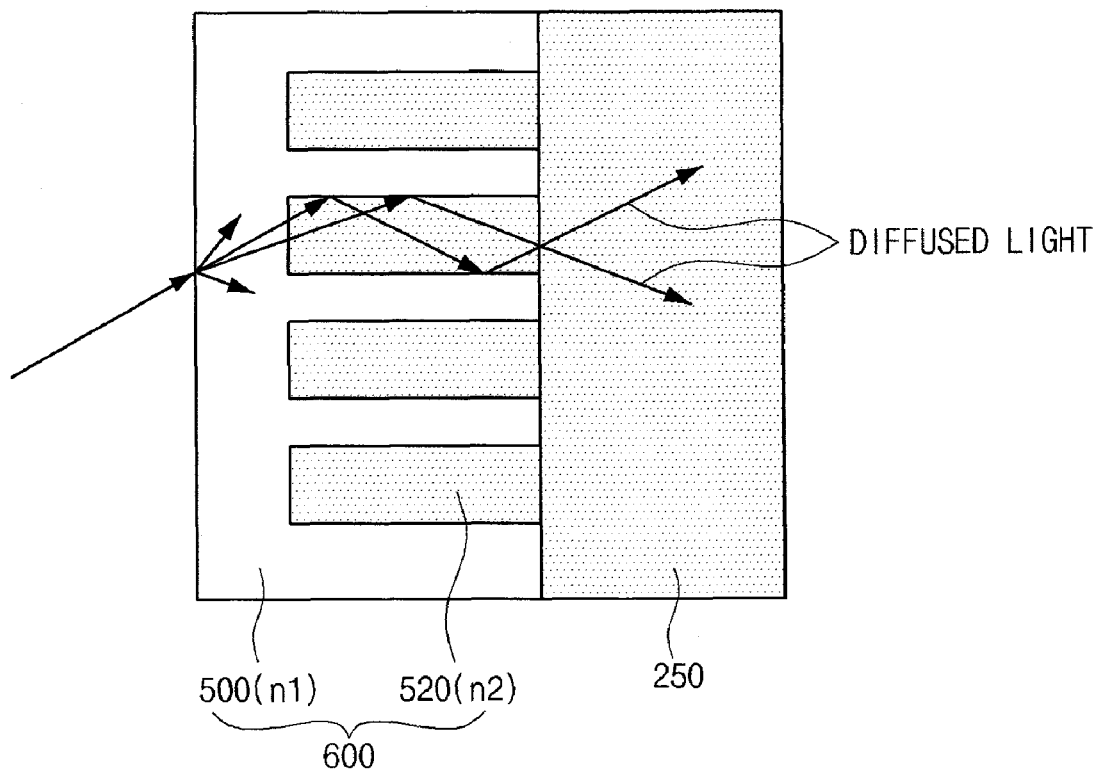
FIG. 7 is a cross-sectional view of the optical waveguide grid array of FIG. 5.

FIG. 5 is a cross-sectional view illustrating a state where a color filter of a liquid crystal panel of an LCD is removed by using the lenticular lens array 300, according to the second embodiment of the present invention, and FIG. 6 is a perspective view of a optical waveguide grid array of FIG. 5, and FIG. 7 is a cross-sectional view of the optical waveguide grid array of FIG. 5.

As illustrated in FIGS. 3 and 4, due to the particle-dispersion diffusion layer 500 in which the beads or fine particles 510 are dispersed in the transparent resin, lights may not be sufficiently diffused or not parallel in their proceeding directions. In order to increase a light diffusion function by supplementing the problem, referring to FIG. 5, an optical waveguide grid 520 having a refractive index that is greater than resin that constitutes the particle-dispersion diffusion layer 500 may be disposed inside the particle-dispersion diffusion layer 500. Thus, the optical waveguide grid 520 is combined with the particle-dispersion diffusion layer 500 in which the beads or fine particles 510 are dispersed, so that a diffusion optical waveguide grid 600 is constituted. When light is incident on the particle-dispersion diffusion layer 500 of the diffusion optical waveguide grid 600, light that is diffused due to the particle-dispersion diffusion layer 500 is guided by the optical waveguide grid 520, and so directivity toward the front of the LCD is improved.

More specifically, when the light diffused due to the particle-dispersion diffusion layer 500 is incident into the optical waveguide grid 520, the light proceeds along the optical waveguide grid 520 due to total internal reflection regardless of the incidence direction of the light, and then the diffused light is emitted toward the front of the LCD. Thus, the three-color R, G, and B lights proceed in parallel in a direction toward the front of the LCD regardless of the incidence angles of the lights. As a result, the light that passes through the lenticular lens 310 and the R, G, and B liquid crystal subpixels 230 placed in the center of a compartment or the light that proceeds to be inclined toward the lenticular lens 310 and the R, G, and B liquid crystal subpixels 230 placed at the edge of the compartment are diffused at the same diffusion angle centering on the front of the LCD due to the diffusion optical waveguide grid 600 so that a color or brightness change according to the viewing angle are minimized and a high color image quality can be obtained.

Referring to FIG. 6, the structure of the optical waveguide grid 520 is parallel to the direction of the blocking walls 400, and the optical waveguide grid 520 may be disposed to have a width of about 5-100 μa, a height of about 5-300 μm, and a pitch of about 6-150 μm in a vertical direction of the LCD. The pitch may be 1.1 to 3 times the width. The ratio of the width to the height of the optical waveguide grid 520 may be about 1:1 to about 1:30. Except for the structure of the optical waveguide grid 520 illustrated in FIG. 6, the optical waveguide grid 520 may be replaced with a square pillar or cylindrical optical waveguide.

FIG. 7 illustrates an optical principle of the diffusion optical waveguide grid 600. For your better understanding, a portion of the diffusion optical waveguide grid 600 is expanded. Obliquely incident light is diffused due to the diffusion layer 500 in which the beads or fine particles 510 are dispersed, and a portion of the diffused light that is incident into the optical waveguide grid 520, is guided due to total internal reflection and is emitted toward the front of the LCD. In this case, the refractive index $n_2$ of the optical waveguide grid 520 may be greater than the refractive index $n_1$ of the resin that constitutes the diffusion layer 500.

The LCD realizes an image by using polarization rotation. Thus, in the LCD, a material used in forming the diffusion layer 500, a material used in forming the beads 510, and a material used in forming the optical waveguide grid 520 may be materials having no optically-anisotropic property so that a change in polarization does not occur due to the diffusion layer 500. More specifically, the resin that constitutes the diffusion layer 500 has an optically-isotropic property, and the beads 510 dispersed in the resin, and the optical waveguide grid 520 may be formed of a material having an optically-isotropic property.

Figure 8:
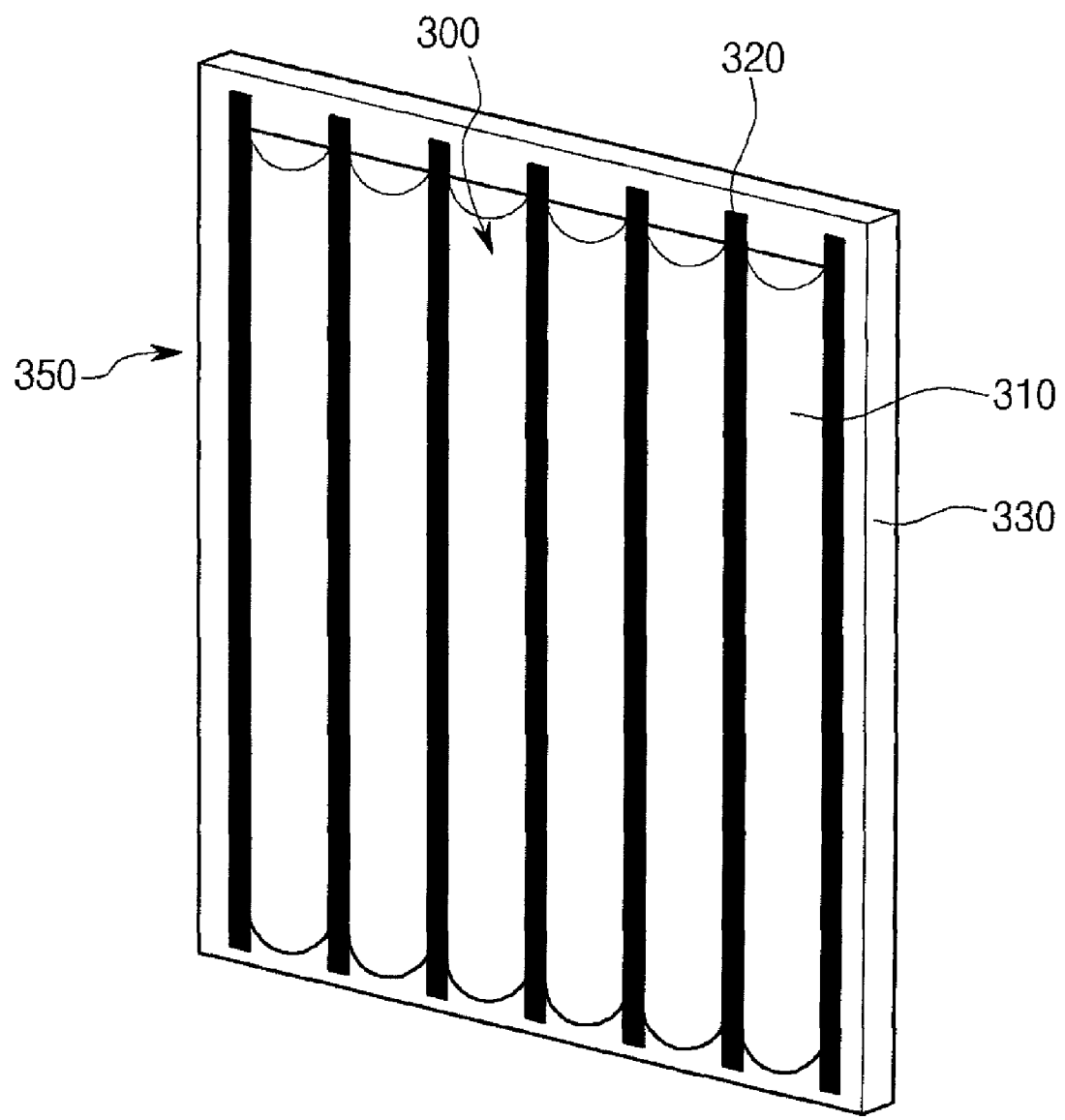
FIG. 8 is a perspective view of a plurality of lenticular lens array according to an embodiment of the present invention.
Figure 9:
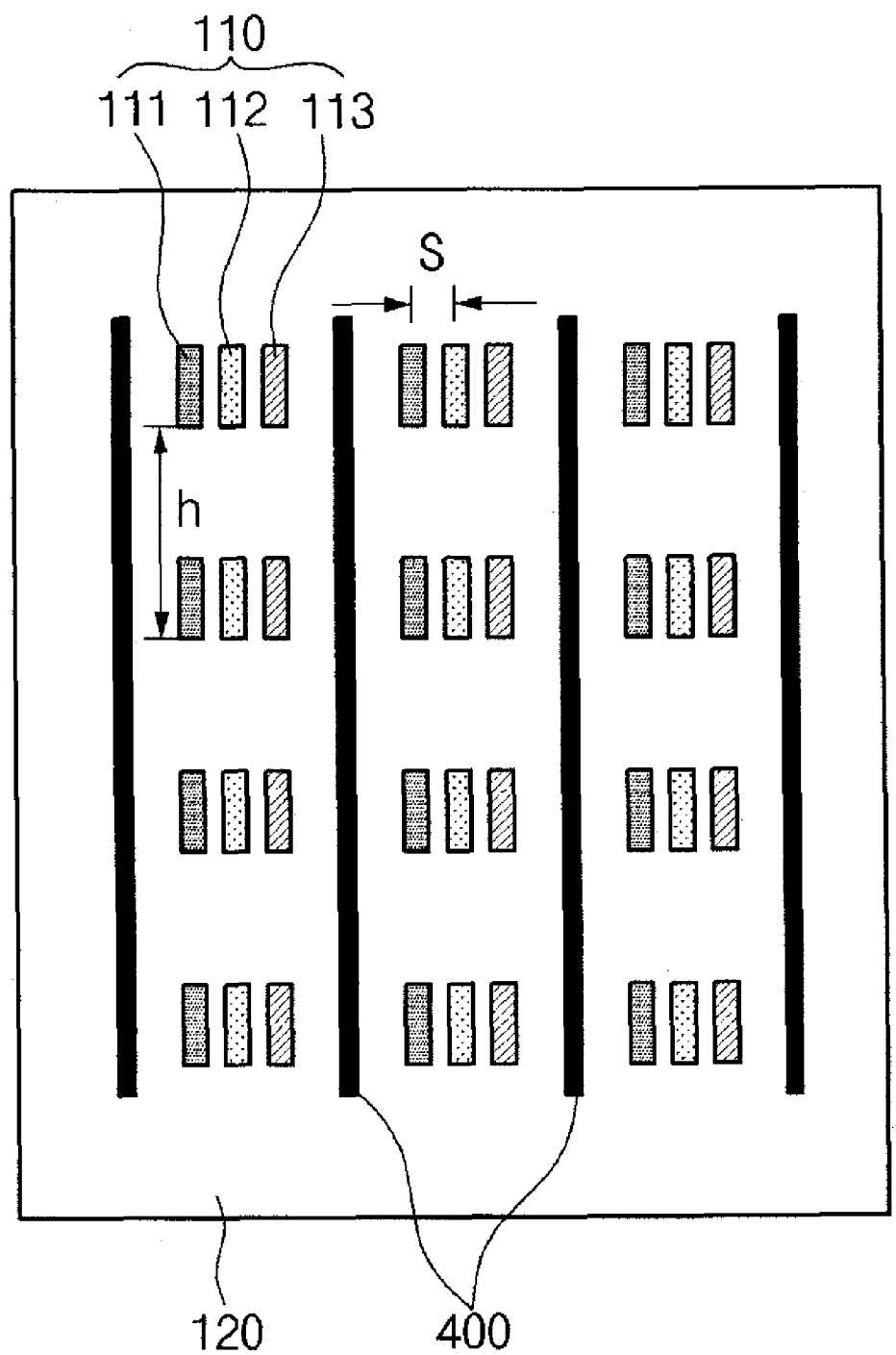
FIG. 9 is a plan view illustrating an arrangement of a plurality of light emitting diodes (LEDs) according to an embodiment of the present invention.
Figure 10:
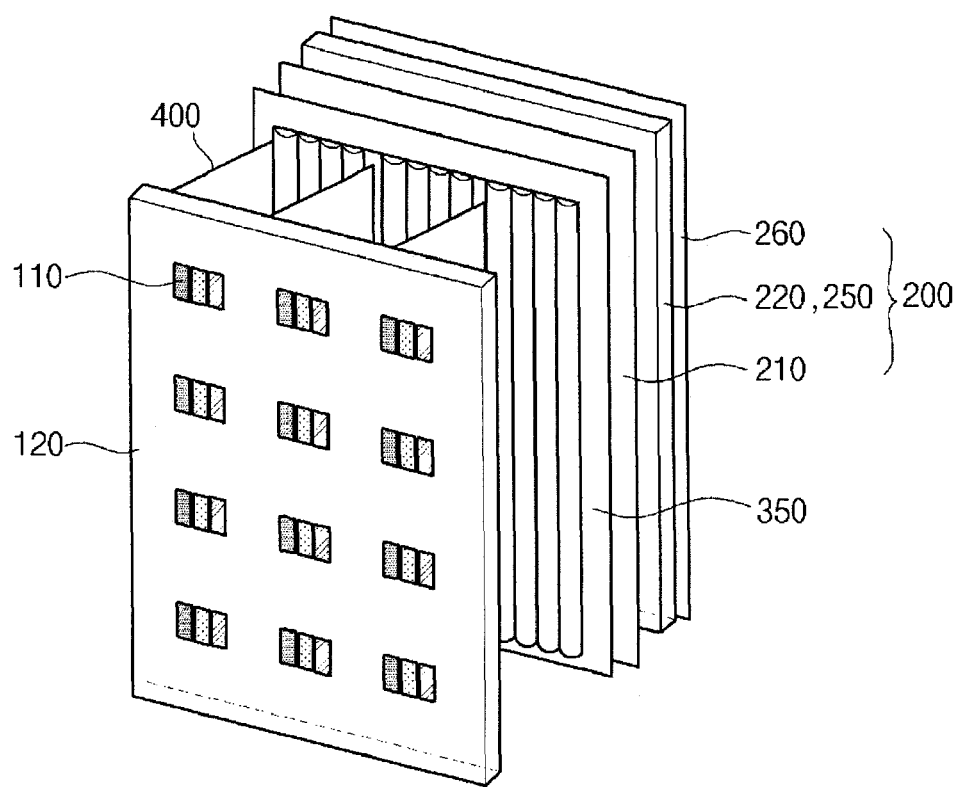
FIG. 10 is a perspective view illustrating a state where the LEDs of FIG. 9 are used.
Figure 11:
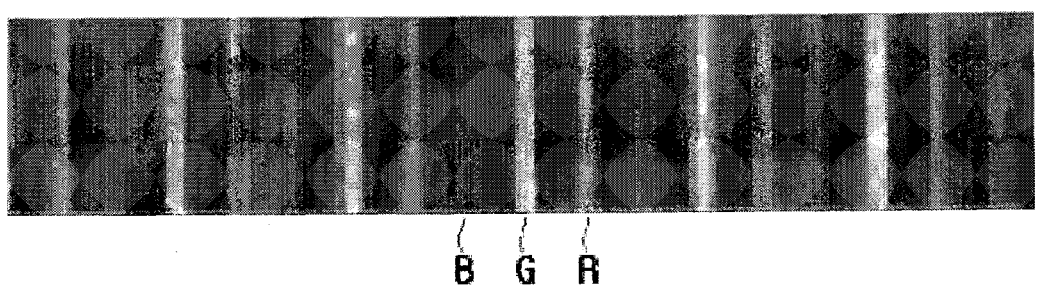
FIG. 11 is a graph showing simulation results according to an embodiment of the present invention.
Figure 12:
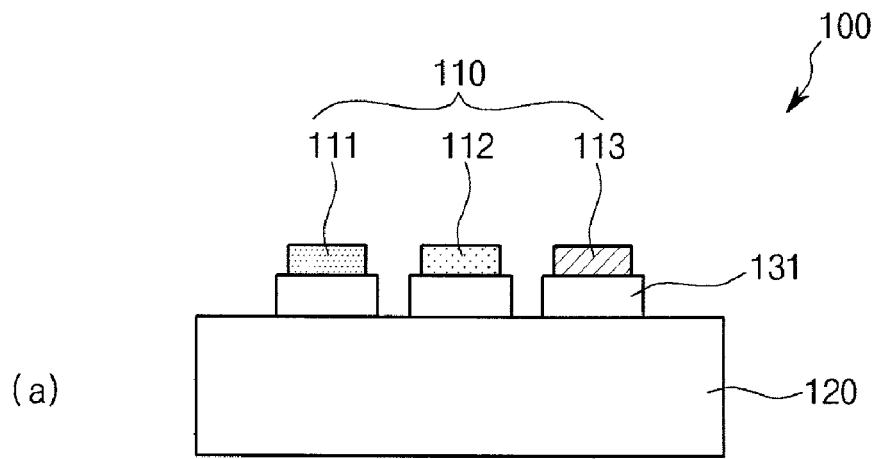
FIG. 12 is a cross-sectional view illustrating a method of attaching the LEDs to the light source backplane according to an embodiment of the present invention.
Figure 12:
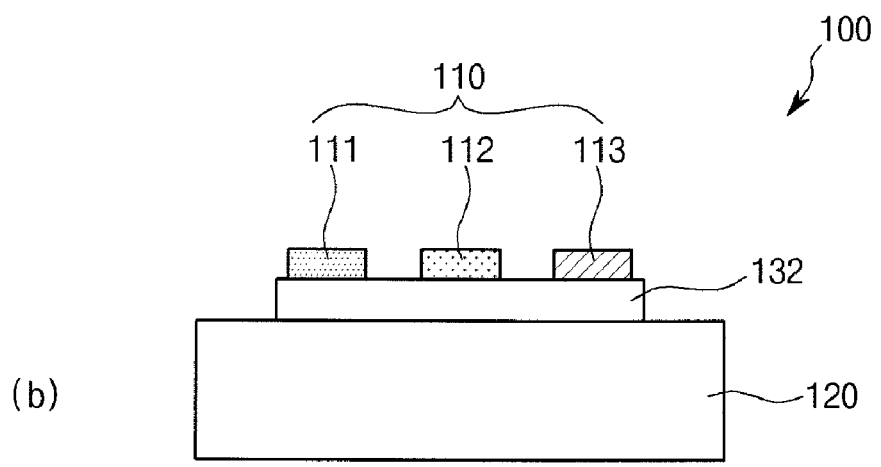
Figure 12:
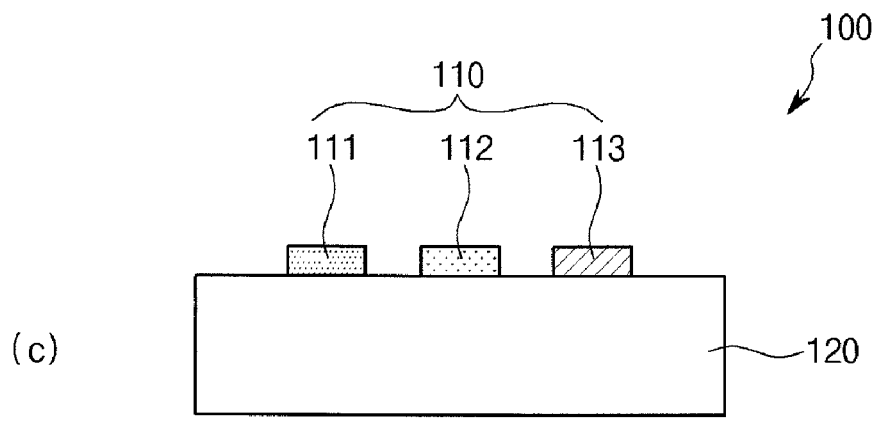
Figure 13:
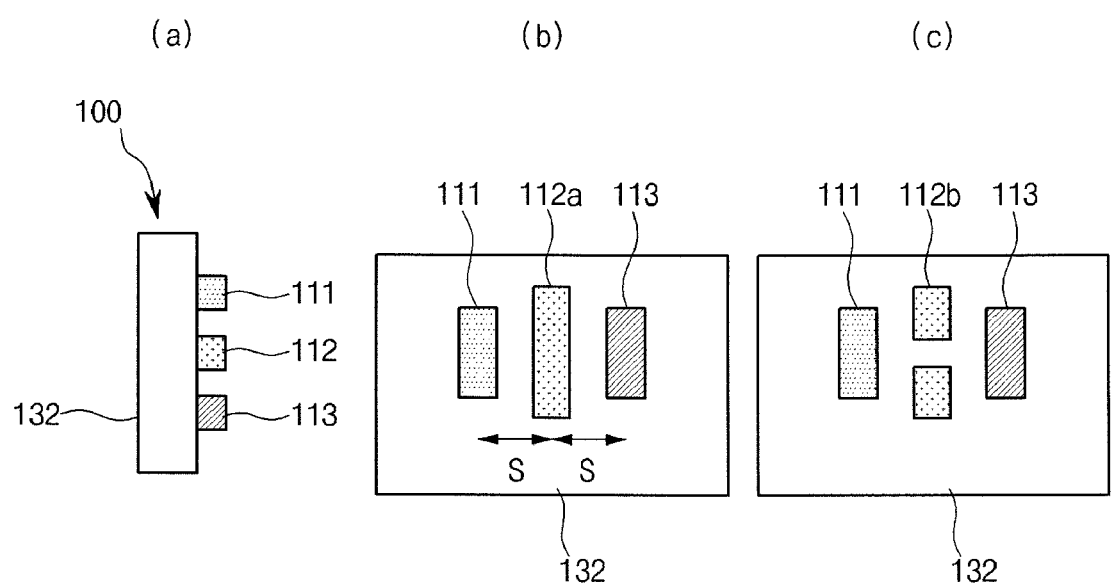
FIGS. 13 and 14 are cross-sectional views and plan views illustrating a method of arranging the LEDs according to an embodiment of the present invention.
Figure 14:
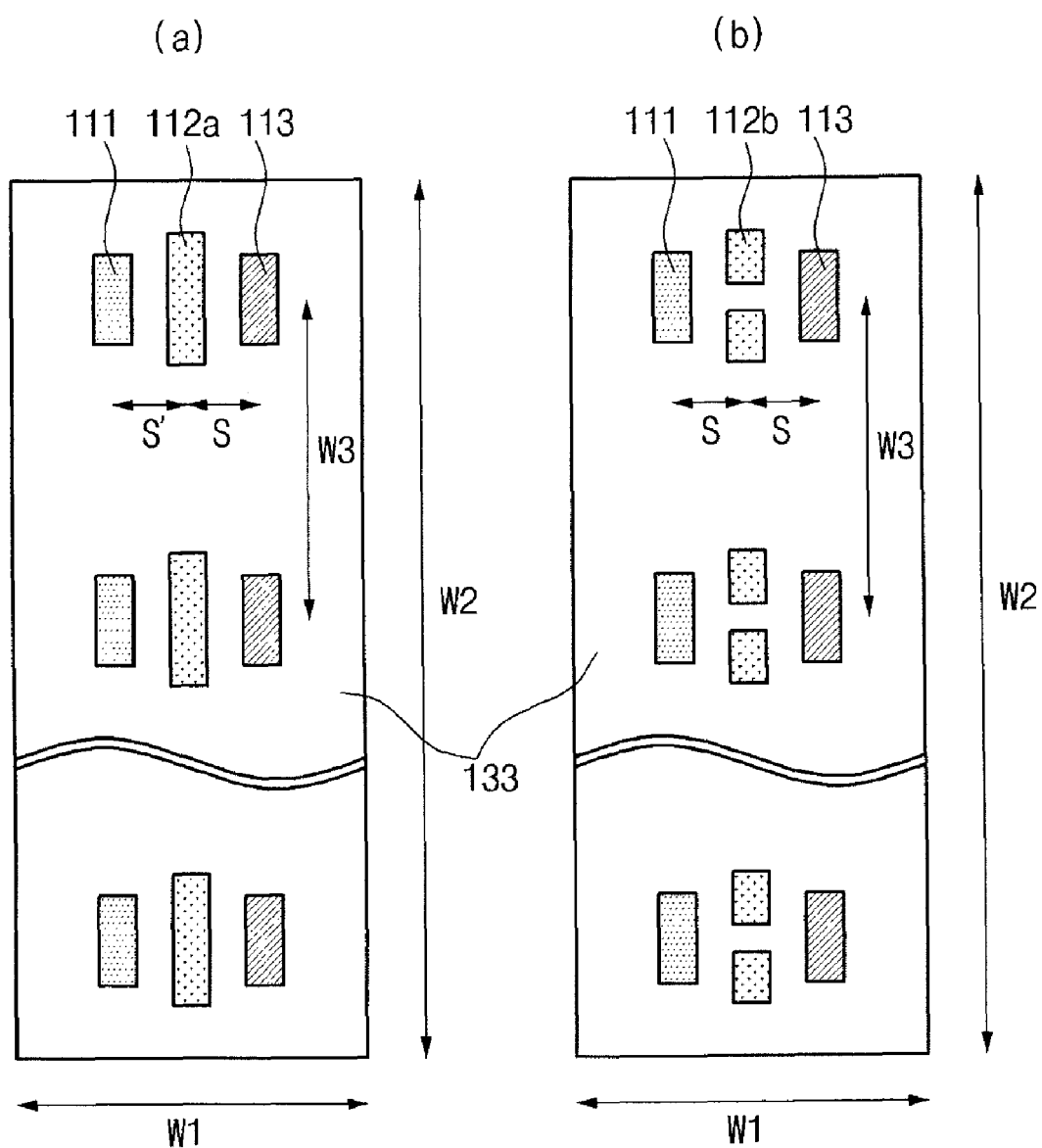
Figure 15:
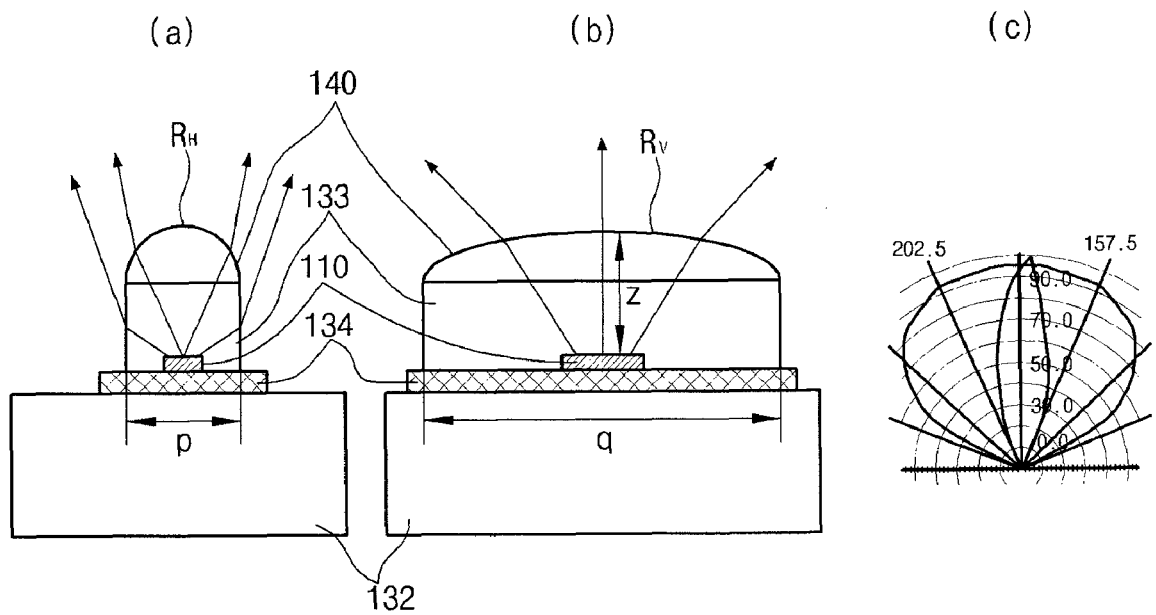
FIGS. 15 and 16 are a latitudinal cross-sectional view and a longitudinal cross-sectional view showing the structure of an LED package according to an embodiment of the present invention.
Figure 16:
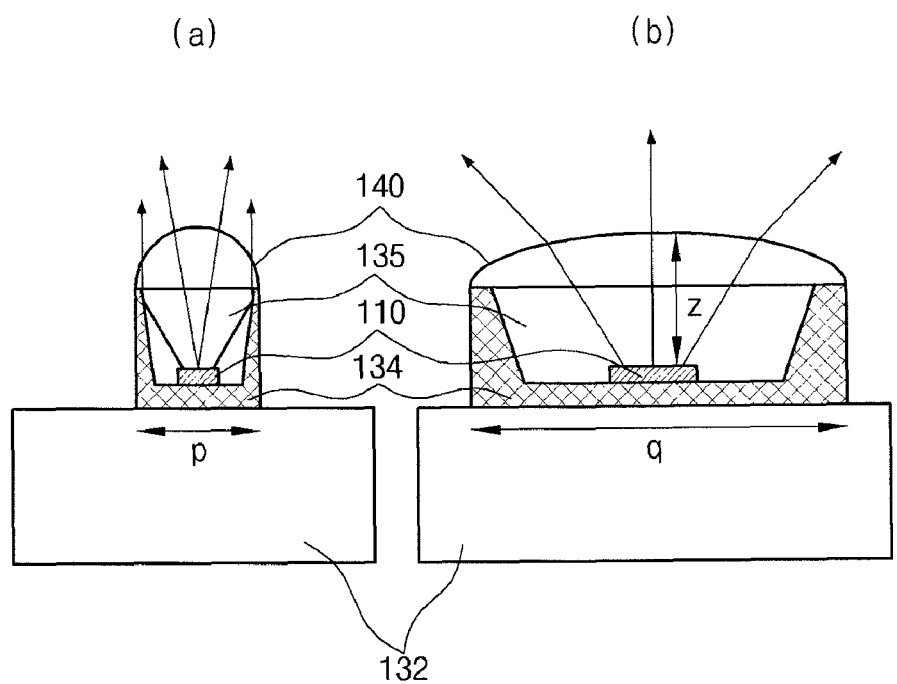

FIG. 8 is a perspective view of the lenticular lens arrays 300 according to an embodiment of the present invention, and FIG. 9 is a plan view illustrating an arrangement of the LEDs 110 according to the second embodiment of the present invention, and FIG. 10 is a perspective view illustrating a state where the LEDs 110 of FIG. 9 are used, and FIG. 11 is a graph showing simulation results according to the second embodiment of the present invention, and FIG. 12 is a cross-sectional view illustrating a method of attaching the LEDs 110 according to the second embodiment of the present invention, and FIGS. 13 and 14 are cross-sectional views and plan views illustrating a method of arranging the LEDs 110 according to the second embodiment of the present invention, and FIGS. 15 and 16 are a latitudinal cross-sectional view and a longitudinal cross-sectional view showing the structure of an LED package according to the second embodiment of the present invention.

The method of disposing the lenticular lens arrays 300 may be performed in such a way that the lenticular lens arrays 300 are attached to the polarization sheet A 210 disposed on the rear glass substrate 220 of the liquid crystal panel 200. As such, an alignment problem that may occur between the lenticular lens arrays 300 and the R, G, and B liquid crystal subpixels 230 can be solved, and the LCD can be simplified and manufactured securely.

Referring to FIG. 8, the lenticular lens arrays 300 may be formed on a substrate 330 formed of a transparent optical material. The substrate 330 may be formed by using a transparent plastic-based sheet, transparent glass or plastic panel. The lenticular lens arrays 300 and the transparent substrate 330 are formed as one body and constitute a lenticular lens array sheet 350. The lenticular lens array sheet 350 is attached to the polarization sheet A 210 that is attached to the rear glass substrate 220 of the liquid crystal panel 200 is formed as one body with liquid crystal panel 200.

Each of the lenticular lenses 310 is convex lens shaped in a horizontal direction, and are straight-line shaped in a vertical direction. Thus, the lenticular lenses 310 may change a point light source in the vertical direction, i.e., into a straight-line shaped image. The lenticular lens array 300 is constituted by arranging the plurality of lenticular lenses 310 in parallel so that a plurality of straight-line shaped images can be formed by using a point light source.

The basic shape of the lenticular lenses 310 is a hemispherical cylinder shape. In order to improve aberration and performance of the lenticular lenses 310, the lenticular lenses 310 may have aspheric shape instead of a circular shape.

Here, aperture widths of the lenticular lenses 310 are adjusted by installing the black light-shielding bands 320 to reduce the color crosstalk and aberrations of the lenticular lenses. The light-shielding bands 320 are disposed inbetween regions of the lenticular lenses 310. In addition, the width of the lenticular lens 310 in the horizontal direction is almost the same as the width of the R, G, and B liquid crystal subpixel 230. However, the practical width of the lenticular lens 310 may be a little bit smaller or greater than the width of the R, G, and B liquid crystal subpixel 230. In the case of the lenticular lens 310 positioned near the center of the compartment, its width is smaller than the width of the R, G, and B liquid crystal subpixel 230 so that the amount of strong lights emitted from the R, G, and B LEDs 110 can be reduced. In the case of the lenticular lens 310 positioned near the edge of the compartment, its width is made greater than the width of the R, G, and B liquid crystal subpixel 230 so that the amount of received lights from the R, G, and B LEDs 110 can be increased. In such a manner, the amount of lights that are received by the lenticular lenses 310 positioned in the center region or marginal region of the lenticular lens array sheet 350 can be made equal.

Furthermore, the width of the black region of the light-shielding band 320 positioned between the lenticular lenses 310 may be adjusted so that the aperture width of the lenticular lens 310 can be increased or reduced, and so the same amount of lights can be incident on all of the lenticular lenses 310 by using the increased or reduced aperture width of the lenticular lens 310. In other words, in order to reduce the amount of lights incident on the lenticular lens 310 positioned in the center of the lenticular lens array sheet 350, the aperture width of the lenticular lens 310 positioned in the center of the lenticular lens array sheet 350 is made smaller than the aperture width of the lenticular lens 310 positioned at the edge of the lenticular lens array sheet 350 so that the same amount of lights can be incident on all of the lenticular lenses 310.

FIG. 9 is a plan view illustrating an arrangement of the LEDs 110 according to an embodiment of the present invention. Three adjacent R, G, and B LEDs 111, 112, and 113 constitute a group 110 of the R, G, and B LEDs. The group 110 of the R, G, and B LEDs is disposed on a light source backplane 120 at regular intervals from side to side upwards and downwards. In this case, the blocking walls 400 are disposed to the right and left side of the group 110 of the R, G, and B LEDs so that the R, G, and B LEDs are divided by the compartments, and lights emitted from the R, G, and B LEDs that belong to different, adjacent compartments can be prevented from being incident on a lenticular lens 310.

In this case, a distance h between the LEDs along the vertical direction varies according to intensities of lights emitted from LED chips and may be within a range of several mm to several tens of cm. The lights emitted from the R, G, and B LED chips that are adjacent in the vertical direction in a compartment are overlapped on the lenticular lens 310 in the R, G, and B liquid crystal subpixels 230 so that uniformity of the lights can be improved. The blocking walls 400 may be attached on the light source backplane 120 to which the group 110 of the R, G, and B LEDs is attached, or it may be attached on the lenticular lens array sheet 350.

Referring to FIG. 9, a horizontal distance S between the R, G, and B LEDs 111, 112, and 113 is determined according to magnification of the lenticular lens 310. When the magnification of the lenticular lens 310 is M' and a distance between the R, G, and B liquid crystal subpixels 231, 232, and 233 is g', a relationship S=M'*g' holds. As specific examples, when M'=10 and g'=0.15 mm, S=1.5 mm. In an actual manufacturing process, specific values are determined according to the size of the LCD and the size of the backlight unit 100, wherein the specific values are between about 0.5 mm and 5 mm.

FIG. 10 stereographically illustrates the cross-sectional view of FIG. 3. The R, G, and B LEDs 110 are disposed at the front side of the light source backplane 120 at regular intervals along horizontal and vertical directions. Electronic elements applying currents to the R, G, and B LEDs 110 and electrical lines for the R, G, and B LEDs 110 are disposed at the light source backplane 120. Also, units for dissipating heat generated in the R, G, and B LEDs may be installed on the light source backplane 120. The blocking walls 400 that are disposed between the light source backplane 120 and the liquid crystal panel 200 prevents interference between the lights emitted from the R, G, and B LEDs 110 that belong to different compartments on the same subpixel. The lenticular lens array sheet 350 may be attached to the liquid crystal panel 200 to which the polarization sheet A 210 is attached and may be formed as one body with the liquid crystal panel 200.

In this way, simulation using a "Light Tools" optical simulation program is carried out on the liquid crystal panel 200 and the backlight unit 100 in which the R, G, and B LEDs 110 illustrated in FIG. 10 are used as light sources and from which a color filter is removed by using the lenticular lens array 300. As a result of simulation, distribution of lights at a position where the R, G, and B liquid crystal subpixels 230 are disposed is shown in FIG. 11. The R-light, the G-light, and the B-light are shown to form linear images along the vertical direction with the same intervals as the R, G, and B color filters of the R, G, and B liquid crystal subpixels 230.

FIG. 12 is a cross-sectional view illustrating a method of attaching the LEDs 110 to the light source backplane 120 according to the second embodiment of the present invention. There are a couple of methods attaching of the R, G, and B LEDs 110 to the light source backplane 120, including a method of attaching a top-emission type package LED to the light source backplane 120 and a method of directly attaching the R, G, and B LEDs 110 to the light source backplane 120 in a chip on board (COB) manner. In both of the methods, a printed circuit board (PCB) or metal core printed circuit board (MCPCB) having a function of effectively diffusing a large amount of heat generated in the R, G, and B LEDs 110 is used.

Referring to (a) of FIG. 12, a method of attaching general R, G, and B package LED 110 in which the independent, individual R, G, and B LEDs 111, 112, and 113 installed on a PCB or MCPCB substrate 131 having a heat-dissipation function, are attached to the light source backplane 120 has an advantage of using a commercialized package LED. However, distances between the R, G, and B LEDs 110 need to be precisely adjusted.

In addition, referring to (b) of FIG. 12, there is a method of attaching a multi-chip LED package in which R, G, and B LEDs 111, 112, and 113 are attached to an LED substrate 132 made of a PCB or MCPCB to the light source backplane 120 in a regular intervals along the vertical and horizontal directions.

When the methods represented in (a) and (b) of FIG. 12 are used, the LED substrates 131 and 132 should be fabricated as a PCB or MCPCB having a high heat-dissipation function, and the light source backplane 120 may be fabricated with low costs by using a material such as plastics having a lower heat-dissipation function.

Referring to (c) of FIG. 12, the R, G, and B LEDs 110 may be directly attached to the light source backplane 120 without the need of an LED substrate. In this case, thermal resistance between the R, G, and B LEDs 110 and the light source backplane 120 is reduced, and the R, G, and B LEDs 110 can be efficiently cooled. When the R, G, and B LEDs 110 are well cooled, the temperature of the R, G, and B LEDs 110 decreases, a life span thereof is increased, and stability is improved. However, in this case, a burden for costs used in forming the light source backplane 120 of a high-priced PCB or MCPCB having a high heat-dissipation function may occur.

FIG. 13 illustrates a method of obtaining white light by adjusting intensities of the R, G, and B LEDs 111, 112, and 113. (a) of FIG. 13 is a cross-sectional view, and (b) and (c) of FIG. 13 are plan views. When forming the white light, G-light requires more amount of light than R-light and B-light and thus, the size of the G-LED 112 or the number thereof may be increased.

In other words, the size of a G-LED 112a disposed on an LED substrate 132 fabricated of the same material used in forming a PCB or MCPCB having a heat-dissipation function may be increased, as illustrated in (b) of FIG. 13, or two G-LEDs 112b may be used so as to provide necessary amount of light, as illustrated in (c) of FIG. 13.

FIG. 14 illustrates a state where a plurality of R, G, and B LEDs disposed in a compartment are arranged on a long LED substrate 133 at an equivalent distance W3 in a vertical direction. Referring to (a) of FIG. 14, the size of a G-LED 112a is increased as compared to a R-LED 111 and a B-LED 113, as illustrated in (b) of FIG. 13, and referring to (b) of FIG. 14, the number of G-LEDs 112a is increased twice as compared to the R-LED 111 and the B-LED 113.

In this way, the plurality of R, G, and B LEDs are disposed on the long LED substrate 133 so that the R, G, and B LEDs can be more precisely disposed. In addition, the entire portion of light source backplane 120 is not fabricated as a PCB or MCPCB but only the long LED substrate 133 is fabricated as a PCB or MCPCB and is disposed on the light source backplane 120 made of plastics or PCB so that manufacturing costs can be reduced and high heat-dissipation efficiency can be obtained together.

The size of the long LED substrate 133 may be determined in the range of 5-100 mm in a horizontal direction W1. In a vertical direction W2, the size of the long LED substrate 133 may be determined to the size of the liquid crystal panel 200. The distance W3 between the R, G, and B LEDs 110 that is same as h in FIG. 3 may be determined by the intensities of lights emitted from the R, G, and B LEDs 110 in the range of about 5-100 mm.

Hereinafter, a method of improving light efficiency by adjusting divergence angles of lights emitted from the R, G, and B LEDs 110 illustrated in FIGS. 12 and 13 will be described with reference to FIGS. 15 and 16. FIGS. 15 and 16 are a latitudinal cross-sectional view and a longitudinal cross-sectional view showing the structure of an LED package according to an embodiment of the present invention.

FIG. 15 illustrates an LED package in which a plurality of oval lenses 140 having oval planes are disposed on the front of the R, G, and B LEDs 110 of FIG. 11 so as to adjust divergence angles of lights emitted from the R, G, and B LEDs 110 so that as much light energy as possible enters the lenticular lens array 300 and the liquid crystal panel 200 without a color filter and light energy efficiency is improved.

The radius of curvature of the oval lens 140 along the horizontal direction needs to be small so that the lights emitted from the R, G, and B LEDs 110 can be emitted with small divergence angles within the blocking walls 400, as illustrated in (a) of FIG. 15. And the radius of curvature of the oval lens 140 along the vertical direction needs to be large so that the lights from the R, G, and B LEDs 110 can be emitted with large divergence angles, as illustrated in (b) of FIG. 15.

In this way, an oval lens with radii of curvature that are different along the horizontal and vertical directions, is disposed in front of each of the R, G, B LEDs. The R, G, and B LEDs 110 are positioned to a depth z into transparent mould resin 133 having different horizontal and vertical widths p and q. And the surface of the mould resin 133 is processed as an oval having different widthwise and lengthwise radii of curvature so that a difference between horizontal and vertical divergence angles occurs. The R, G, and B LEDs 110 may be disposed on a LED chip mount 134 and on the LED substrate 132 or may be disposed on the LED substrate 132 in a surface mounting method without the LED chip mount 134. The R, G, and B LEDs 110 are moulded into the resin 133 that has the shape of an oval lens 140 attached to the front surfaces of the R, G, and B LEDs 110.

In this case, the horizontal width p of the resin 133 for moulding may be determined in the range of 0.5-5 mm according to the size of the LCD, and the vertical width q of the resin 133 for moulding may be determined in the range of 2-20 mm.

(c) of FIG. 15 shows the result of simulation using an optical simulation program of the degrees of divergence of lights emitted from the R, G, and B LEDs 110 by using the oval lens 140. Referring to (c) of FIG. 15, the degrees of divergence of luminance distribution vary along the horizontal direction and the vertical direction. A difference in the degrees of divergence of the lights emitted from the R, G, and B LEDs 110 along the horizontal and the vertical directions is determined by the horizontal radius of curvature $R_H$, the vertical radius of curvature $R_V$ of the oval lens 140, and a burying depth z of the R, G, and B LEDs 110.

The sizes of long and short axes of the oval lens 140 disposed on the transparent mould resin 133 illustrated in (a) of FIG. 15 are the same as the sizes p and q of the transparent mould resin 133. The radii of curvature of the oval lens 140 are determined by divergence angles. The horizontal radius of curvature of the oval lens 140 may be determined at a small divergence angle and thus is determined in the range of the ratio ($z/R_H$) of the radius of curvature to the burying depth of the R, G, and B LEDs 110 and is typically about 1~3. For example, when p=2 mm and $R_H$=1 mm, z=1~3 mm.

The vertical radius $R_V$ of curvature of the oval lens 140 may be determined at a large divergence angle and thus is determined in the range of about 0.1 to 1. For example, q=6 mm, $R_V$=3 mm and z=2 mm, $z/R_V$=0.67.

FIG. 16 illustrates an improvement in the LED package of FIG. 15, in which the R, G, and B LEDs 110 are moulded into the transparent mould resin 133. In other words, the R, G, and B LEDs 110 are placed in the LED chip mount 134 having a hollow cup shape, or the LED chip mount 134 is filled with a transparent resin 135, and the wall surfaces inside the LED chip mount 134 are processed to be reflective, and the oval lens 140 is disposed on the LED chip mount 134 so that lights emitted from the R, G, and B LEDs 110 are reflected from the wall surfaces inside the LED chip mount 134 or may be diverged at different divergence angles in horizontal and vertical directions by the oval lens 140. As such, loss of light emitted from a side surface of the transparent mould resin 133 can be minimized, and also divergence angles of lights emitted from the R, G, and B LEDs 110 in the horizontal and vertical directions can be adjusted.

Figure 17:
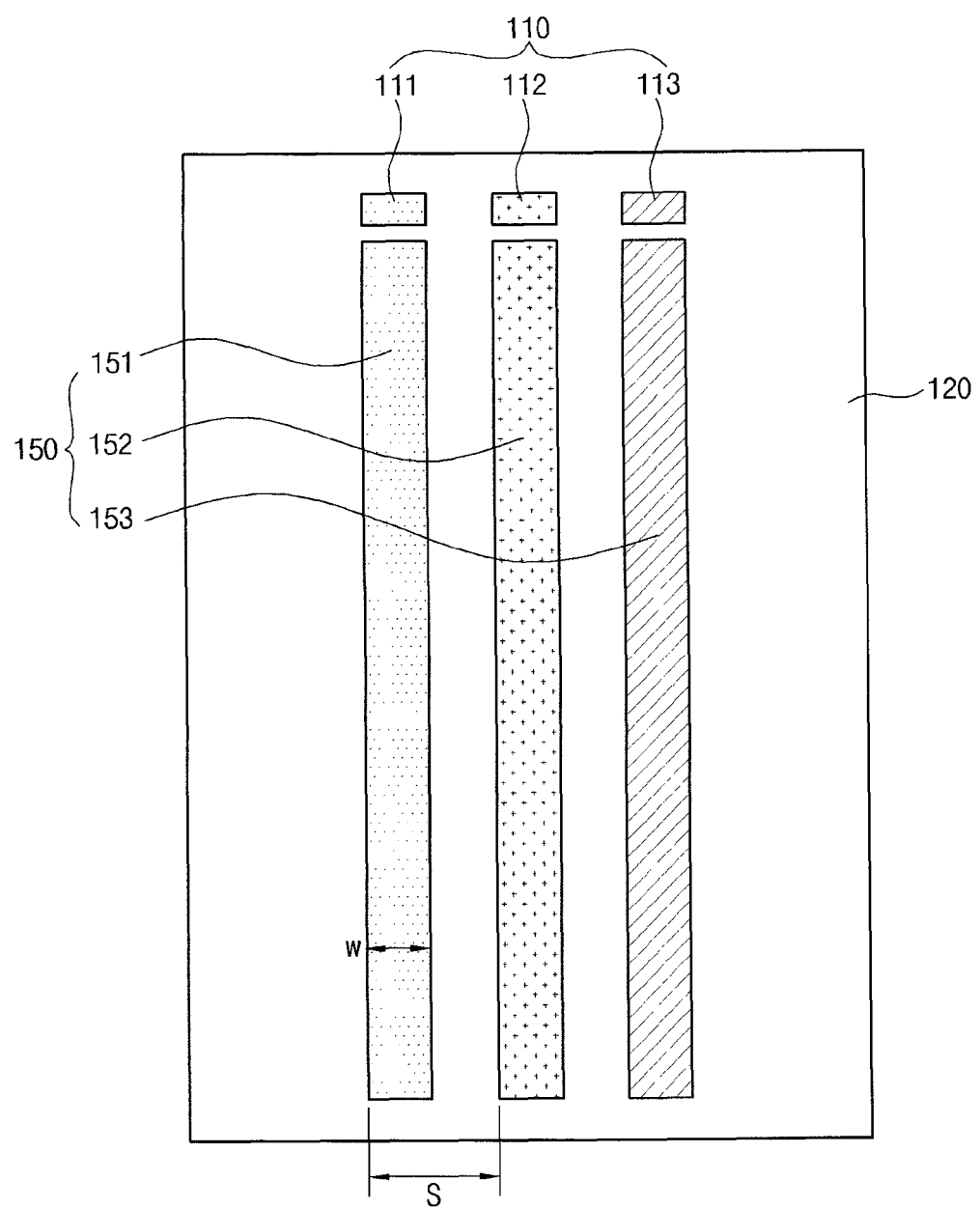
FIG. 17 is a plan view illustrating a structure of a optical waveguide of the LCD without the color filter according to another embodiment of the present invention.
Figure 18:
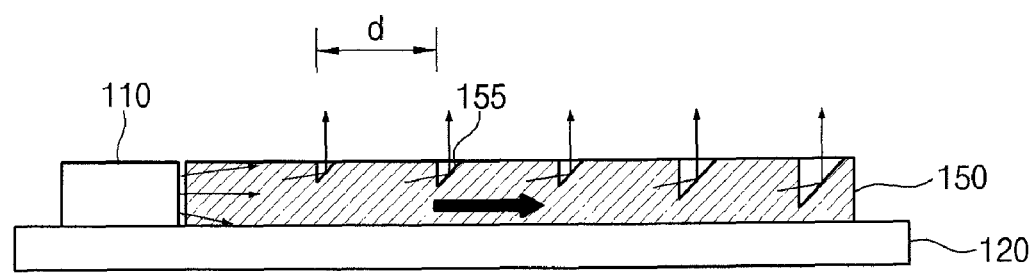
FIG. 18 is a cross-sectional view illustrating a structure of the optical waveguide of FIG. 17.
Figure 19:
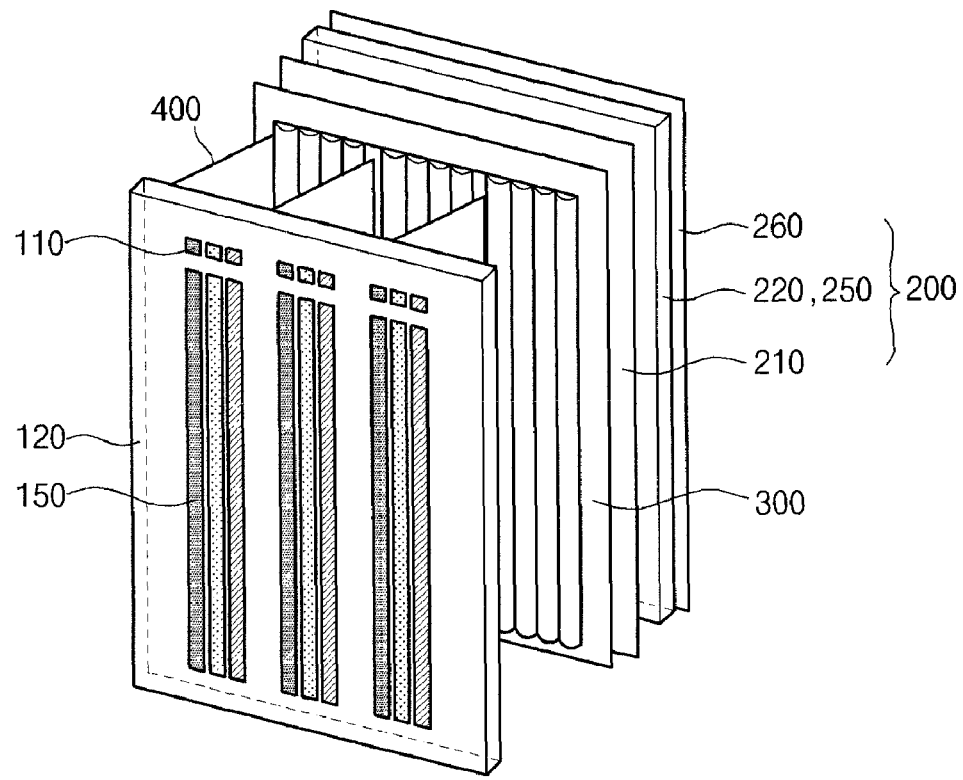
FIG. 19 is a perspective view illustrating a state where the optical waveguide of FIG. 17 is used.
Figure 20:
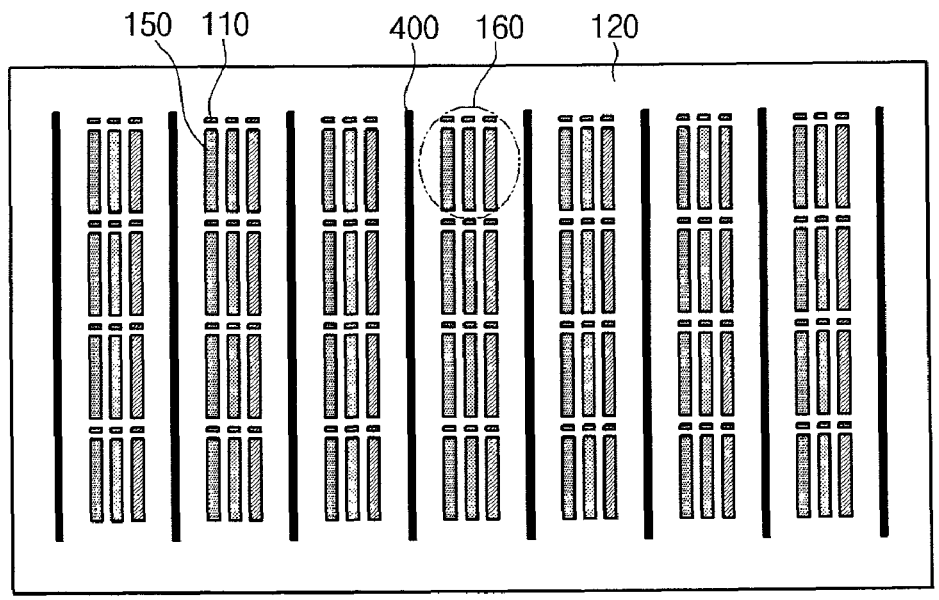
FIG. 20 is a plan view illustrating the optical waveguide of FIG. 17 according to another embodiment of the present invention.

Hereinafter, an LCD without a color filter according to the third embodiment of the present invention will be described with reference to FIGS. 17 through 20. FIG. 17 is a plan view illustrating a structure of a optical waveguide of the LCD without the color filter according to another embodiment of the present invention. FIG. 18 is a cross-sectional view illustrating a structure of the optical waveguide of FIG. 17, and FIG. 19 is a perspective view illustrating a state where the optical waveguide of FIG. 17 is used, and FIG. 20 is a plan view illustrating the optical waveguide of FIG. 17 according to the third embodiment of the present invention.

The LCD without the color filter according to the current embodiment includes edge emission type R, G, and B LEDs and allows lights emitted from the R, G, and B LEDs 110 into straight-line R, G, and B optical waveguides 150 disposed on the light source backplane 120 to convert the current light source type into a linear light source type.

As described in FIGS. 9 and 10, when the R, G, and B LEDs 110 having the property of point light sources are used, lights emitted from the R, G, and B LEDs 110 are very strong toward the normal direction, and as the lights emitted from the R, G, and B LEDs 110 deviates from the normal direction, the lights become weak, and so overall uniformity is lowered. In order to solve the problem, referring to FIG. 17, the R, G, and B LEDs 110 and the R, G, and B optical waveguides 150 are disposed on the light source backplane 120 and thus, uniformity can be improved.

In other words, FIG. 17 illustrates a structure of the optical waveguide in which point light sources are changed into three, parallel R, G, and B linear light sources by using the R, G, and B LEDs 111, 112, and 113 and R, G, and B optical waveguides 151, 152, and 153. Light emitted from the edge emission type R-LED 111 is incident into the R-optical waveguide 151 disposed in a compartment in a vertical direction and proceeds along the R-optical waveguide 151 due to total internal reflection. Similarly, lights emitted from the edge emission type G-LED 112 and B-LED 113 proceed along the G-optical waveguide 152 and the B-optical waveguide 153, respectively.

A distance between the R, G, and B optical waveguides 151, 152, and 153 is S=M'*g' like in the case when the R, G, and B LEDs 110 are used. Here, M' is magnification of a lenticular lens, and g' is a distance between R, G, and B liquid crystal subpixels.

The width w of the R, G, and B optical waveguides 150 is determined in such a way that the image of the optical waveguides formed by the lenticular lens array 300 matches to the width e of the R, G, and B liquid crystal subpixels. Since the lenticular lens reduces the width w of the R, G, and B optical waveguides 150 by magnification M', the relation w=M'*e holds. In actuality, w may be smaller than M'*e so as to reduce color crosstalk between the adjacent R, G, and B liquid crystal subpixels.

A light split structure is installed on the surface of the R, G, and B optical waveguides 150 so that the lights guided inside of the R, G, and B optical waveguides 151, 152, and 153 due to total internal reflection are emitted at 90 degrees toward the lenticular lens. The light split structure that splits the lights guided inside of the R, G, and B optical waveguides 151, 152, and 153 due to total internal reflection in the horizontal direction may be a plurality of concave prisms 155 installed at the top surface of the optical waveguide of FIG. 18, a plurality of prisms 910 installed at the bottom surface of the optical waveguide of FIG. 26 that will be described later, or a plurality of inverse prisms 920 installed at the top surface of the optical waveguide of FIG. 27. Here, the concave prisms 155 of FIG. 18 will be described.

FIG. 18 illustrates an operational principle how the lights guided along the R, G, and B optical waveguides 150 due to total internal reflection are split toward the vertical direction due to the light split structure having the shape of the concave prisms 155. When grooves having the shape of the concave prisms 155 are formed on the surface of the R, G, and B optical waveguides 150, lights incident on the concave prisms 155 are reflected from an inclined plane of the concave prisms 155, and are deflected toward the direction of the lenticular lens array 300.

In this case, the reflectivity of the surface of the concave prisms 155 varies according to polarization. Thus, the lights that are reflected and proceed in the direction of the lenticular lens array 300 become linearly polarized lights. When the refractive index of the R, G, and B optical waveguides 150 is assumed as 1.5, the ratio of the mutually perpendicular s-polarized light to p-polarized light that are reflected from the inclined plane of the concave prisms 155 is about 11 times and thus the deflected light has a linear polarization property.

The absorption of the said linearly polarized light is reduced at the polarization sheet A 210 attached to the rear glass substrate 220 of the liquid crystal panel 200 and thus additional increase in light efficiency can be obtained. The size of the concave prisms 155 that are installed at the surface of the R, G, and B optical waveguides 150 is increased as farther away from the R, G, and B LEDs 110 so that intensities of the lights split by each of the concave prisms 155 may be uniform. Alternatively, the distance d between the concave prisms 155 having the same size is gradually reduced along the optical waveguide so that the split lights can be uniform.

The distance d between the concave prisms 155 should be a distance at which uniformity of light can be guaranteed along the vertical direction at the lenticular lens array 300 and the R, G, and B liquid crystal subpixels. In actuality, the distance d from about 1-50 mm may be allowable, and the neighboring concave prisms 155 can be variably separated from one another along the optical waveguide. Except for the light split structure having the concave prism shape illustrated in FIG. 18, examples of structures for splitting the lights proceeding in the R, G, and B optical waveguides 150 include a binary grating, a sinusoidal grating, a microlens array, a lenticular lens array, a photonic crystal, and a multiple prism.

FIG. 19 illustrates an example in which R, G, and B linear light sources are constituted by using the R, G, and B optical waveguides 150 of FIG. 18 and are applied to the LCD without the color filter. Compartments of the light source backplane 120 are defined by the blocking walls 400 along the vertical direction, and R, G, and B optical waveguides 150 are disposed in each of the compartments along the vertical direction. Edge emission R, G, and B LEDs 110 are disposed at the top ends or bottom ends of the R, G, and B optical waveguides 150 and supply lights into the R, G, and B optical waveguides 150. The lights guided inside of the R, G, and B optical waveguides 150 due to total internal reflection are deflected at 90 degrees due to the light split structure and proceed toward the direction of the lenticular lens array 300, as illustrated in FIG. 18.

FIG. 20 illustrates a structure in which a plurality of compartments 160 including the R, G, and B LEDs 110 and the R, G, and B optical waveguides 150 of FIG. 19 are arranged on the light source backplane 120 to the right and left and upwards and downwards. When each LED 110 and each optical waveguide 150 cannot supply the total amount of light that is required by the liquid crystal panel 200 a multiple of LEDs and optical waveguides may supply the amount of light needed in the liquid crystal panel 200. The number of the compartments 160 varies according to brightness of the R, G, and B LEDs 110 and may be about 1 to 50 in the horizontal direction and about 1 to 30 in the vertical direction.

Hereinafter, an LCD without a color filter according to the fourth embodiment of the present invention will be described with reference to FIGS. 21 through 23.

Figure 21:
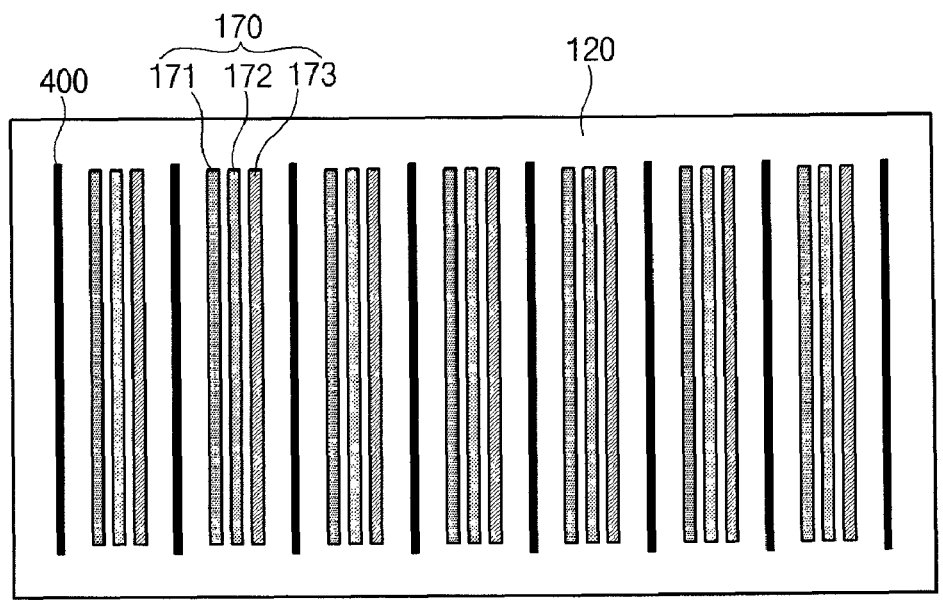
FIG. 21 is a plan view of a backlight unit according to another embodiment of the present invention.
Figure 22:
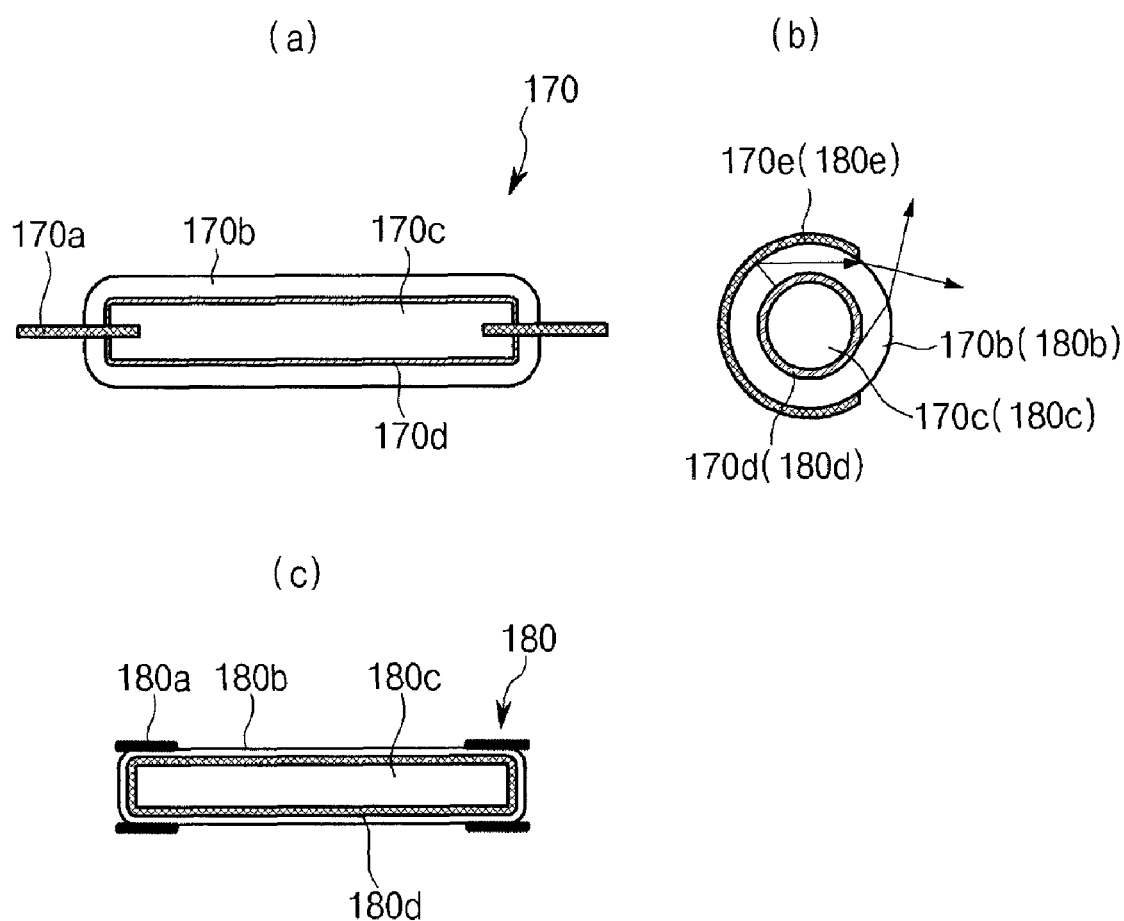
FIG. 22 is a latitudinal cross-sectional view and a longitudinal cross-sectional view of a cold cathode fluorescence lamp (CCFL) and an external electrode fluorescence lamp (EEFL) illustrated in FIG. 21.
Figure 23:
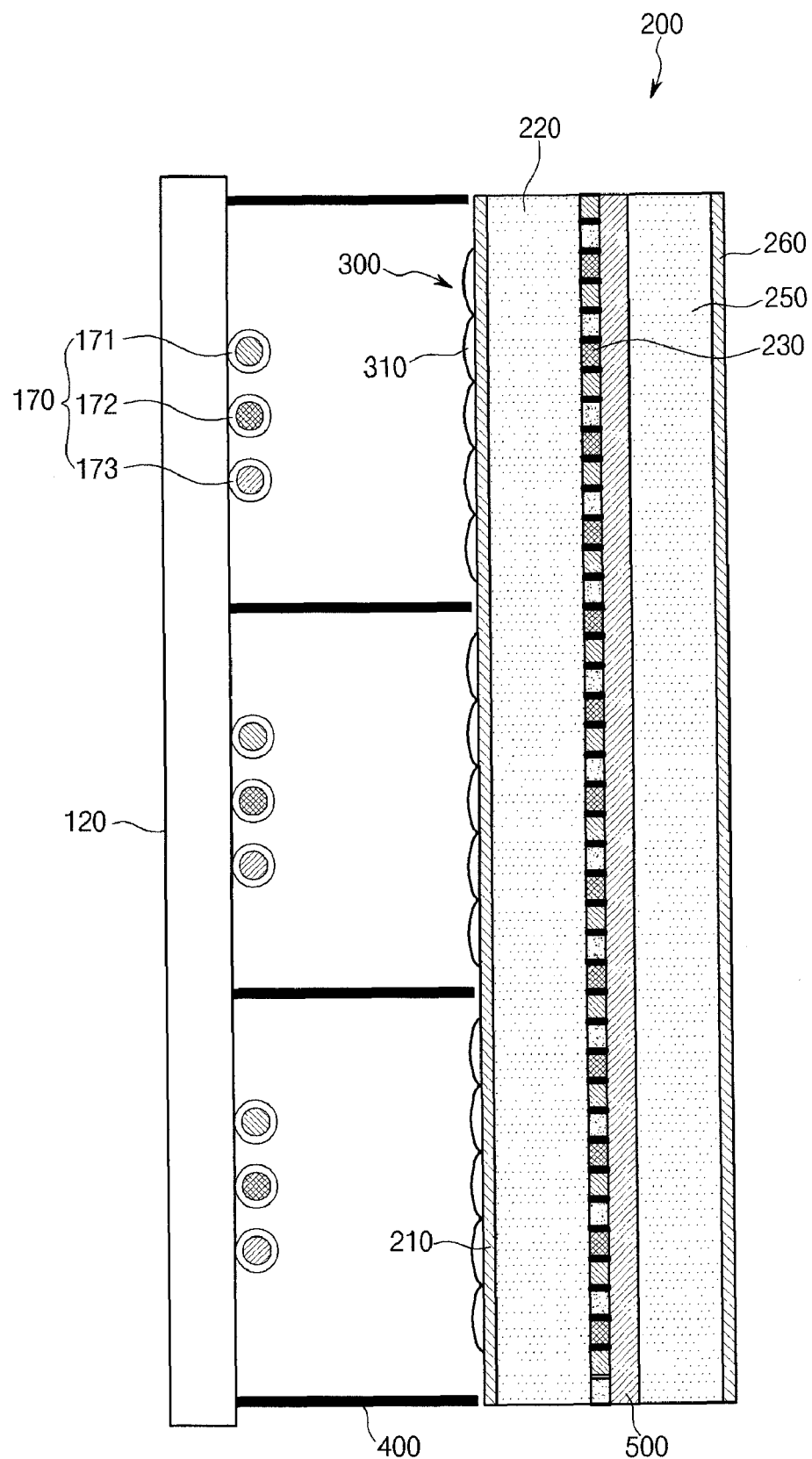
FIG. 23 is a cross-sectional view illustrating a state where the backlight unit of FIG. 21 is used.

FIG. 21 is a plan view of a backlight unit according to the fourth embodiment of the present invention, and FIG. 22 is a latitudinal cross-sectional view and a longitudinal cross-sectional view of a cold cathode fluorescence lamp (CCFL) and an external electrode fluorescence lamp (EEFL) illustrated in FIG. 21, and FIG. 23 is a cross-sectional view illustrating a state where the backlight unit of FIG. 21 is used.

The LCD without the color filter according to the current embodiment includes a three-color supply unit, which is one of R, G, and B CCFLs and R, G, and B EEFLs.

FIG. 21 illustrates an example of a backlight unit in which the R, G, and B CCFLs 170 or EEFLs 180 instead of the R, G, and B LEDs 110 of FIGS. 8 through 16 and the R, G, and B optical waveguides 150 of FIGS. 17 through 20 are replaced as light sources. When the R, G, and B CCFLs 170 or EEFLs 180 are used as light sources, the R, G, and B optical waveguides 150 are not needed, and linear light sources are simply constituted.

Phosphor layers emitting red, green, and blue lights are formed inside of the R-CCFL 171, G-CCFL 172, and B-CCFL 173, respectively. Three R, G, and B CCFLs 171, 172, and 173 constitute a group and are disposed in a compartment divided by the blocking walls 400, and the light source backplane 120 comprises a plurality of compartments divided by the blocking walls 400, and the number of compartments vary according to the size of the LCD and may be 2 to 50, for example.

When the R, G, and B CCFLs 170 or EEFLs 180 are used as light sources, the light source backplane 120 may be formed of a non-conductive material such as plastics as well as a PCB or MCPCB including an electronic circuit. The surface of the light source backplane 120 is processed to be black to prevent deterioration of the image quality that occurs when some of the lights emitted from the R, G, and B CCFLs 170 or EEFLs 180 are reflected from the surface of the light source backplane 120 and are incident on the lenticular lens array 300.

Referring to FIG. 22, in the R, G, and B CCFLs 170 used as light sources, electrodes 170a are exposed to both ends of a glass tube 170b, and cylindrical phosphor layer 170d is coated inside the glass tube 170b, and a discharge gas 170c is injected in the R, G, and B CCFLs 170.

Similarly, in the R, G, and B EEFLs 180 used as light sources, cylindrical phosphor layer 180d is coated inside of the glass tube 180b, and a discharge gas 180c is injected in the R, G, and B EEFLS 180. The only difference between the R, G, and B CCFLs 170 and the R, G, and B EEFLs 180 is that electrodes 180a are not disposed inside of the glass tube 180b and are deposited outside of both ends of the glass tube 180b.

Since lights are not needed to the direction of the light source backplane 120, a rear side of the R, G, and B CCFLs 170 or EEFLs 180 may be metally coated or processed with reflective layers 170e and 180e including reflective films having a scatterer so that all lights can directly pass through the lenticular lens array 300 and are incident on the liquid crystal panel 200.

FIG. 23 illustrates an LCD without a color filter in which the linear R, G, and B CCFLs 170 or EEFLs 180 are used as light sources, and lights emitted from the said light sources are incident into R, G, and B liquid crystal subpixels 232, 232, and 233 of the liquid crystal panel 200 having the polarization sheets 210 and 260 attached to the front and rear sides of the liquid crystal panel 200 by using the lenticular lens array 300.

The backlight unit is divided into a plurality of compartments due to the blocking walls 400, and the lengthwise direction of the R, G, and B CCFLs 170 or EEFLs 180 used as light sources and the lengthwise direction of the lenticular lens array 300 are parallel to each other. And the said light sources are imaged to the R, G, and B liquid crystal subpixels 231, 232, and 233 of the liquid crystal panel 200, respectively, by the lenticular lens 310.

Figure 24:
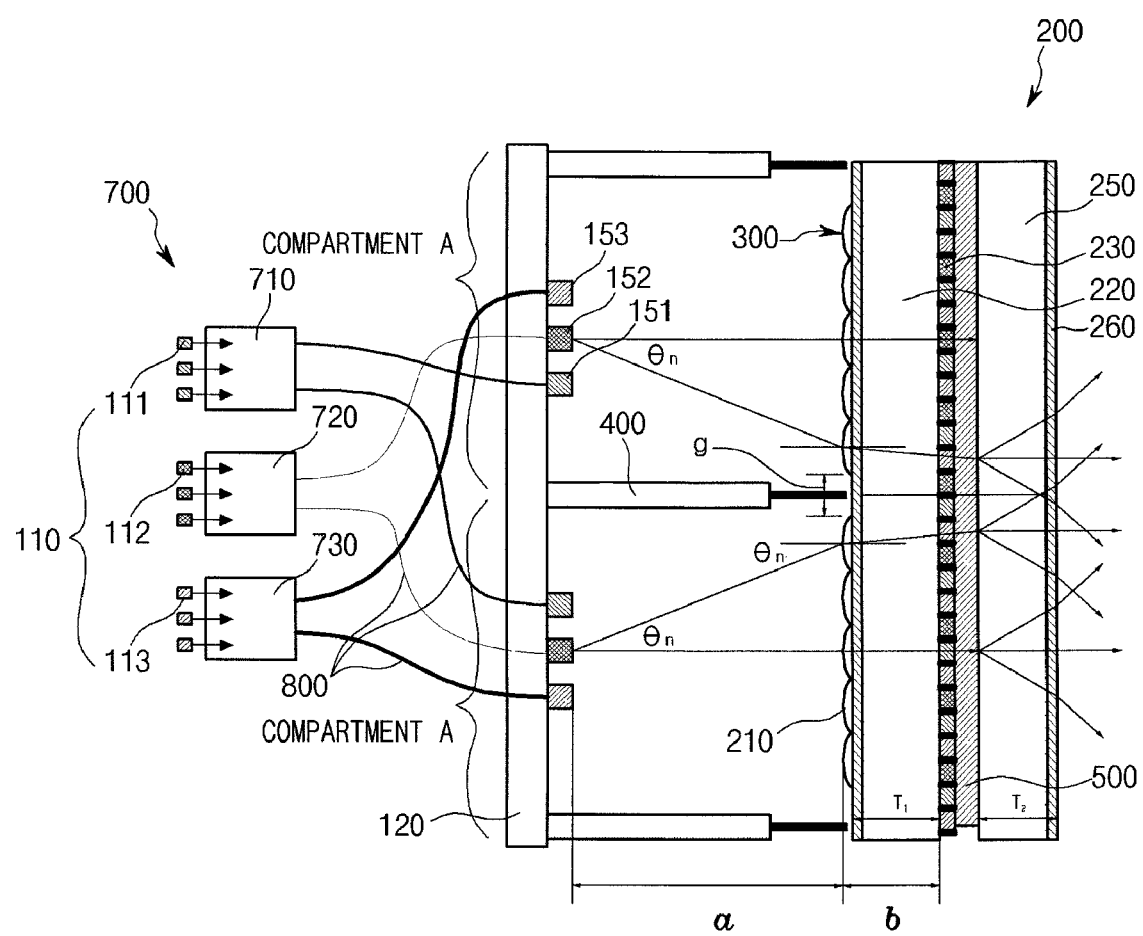
FIG. 24 is a cross-sectional view of an LCD without a color filter according to another embodiment of the present invention.

FIG. 24 is a cross-sectional view of an LCD without a color filter according to the fifth embodiment of the present invention. In FIG. 9, a plurality of R, G, and B LEDs 110 are arranged as R, G, and B light sources in a regular array, and in FIG. 17, R, G, and B lights emitted from the R, G, and B LEDs 110 in the horizontal direction are incident on the R, G, and B optical waveguides 150 which are arranged to be parallel to one another. In this way, when the light emitted from each of the R, G, and B LED 110 is directly used, if a change in optical performance such as brightness and wavelengths of R, G, and B LEDs caused by aging effect occur, lowering of the image quality of the LCD such as spots on a display screen or lowering of brightness may occur.

In order to solve the said problem, in the current embodiment, lights that are uniformly mixed by using light mixers 700 and optical fibers 800, which are three-color supplying units, are supplied to the R, G, and B optical waveguides 150 so that more uniform and stable R, G, and B lights can be supplied. In terms of an R light source, lights emitted from a plurality of R-LEDs 111 are incident into an R-light mixer 710 and are sufficiently mixed and then, the mixed R-light is supplied to a plurality of R-optical waveguides 151 through a plurality of R-optical fibers 810. In this way, differences in the optical property of each of the R-LEDs 111 and a change caused by aging effect are reduced, and more stable and higher image quality can be obtained. A plurality of G-LEDs 112 and a plurality of B-LEDs 113 supply lights to a plurality of G-optical waveguides 152 and a plurality of B-optical waveguides 153 by the same procedure. The light mixer 700 uses a principle of guiding and mixing lights due to total internal reflection, and the shape of the light mixer 700 may be rectangular parallelepiped, cylindrical or semi-cylindrical. Lights emitted from the plurality of R, G, and B LEDs 110 positioned in front of the input side of the light mixer 700 proceed inside the light mixer 700 due to total internal reflection, are mixed uniformly, and are transferred to the plurality of optical fibers 800 disposed near the output side of the light mixer 700.

Figure 25:
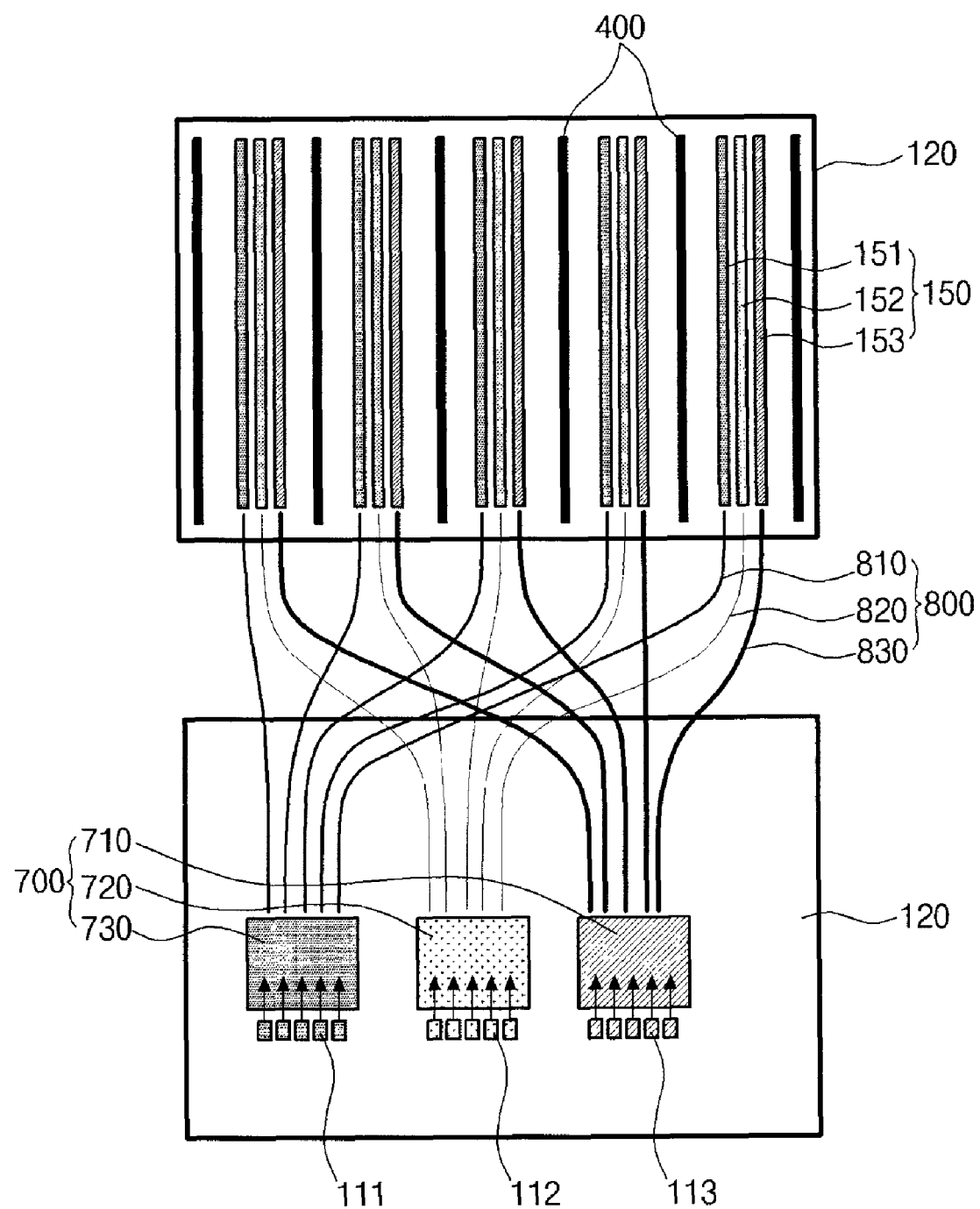
FIG. 25 is a plan view illustrating the structure of the backlight unit of FIG. 24 having separated top and bottom sides.

FIG. 25 is a plan view illustrating the structure of the backlight unit of FIG. 24 showing separated top and bottom sides of the light source backplane 120. FIG. 25 illustrates a state where lights are distributed into a plurality of R, G, and B optical waveguides 150 disposed at the top surface of the light source backplane 120 from a plurality of R, G, and B optical fibers 800 disposed at the bottom surface of the light source backplane 120, of FIG. 24. A plurality of compartments are disposed at the top surface of the light source backplane 120, and a group of R, G, and B optical waveguides 150 is disposed in each of the compartments. A plurality of R, G, and B LEDs 110 and at least three or more light mixers 700 are disposed at the bottom surface of the light source backplane 120, and lights emitted from the light mixers 700 disposed at the bottom surface of the light source backplane 120 are transferred into the R, G, and B optical waveguides 150 disposed at the front side of the light source backplane 120 through a plurality of optical fibers 800. More specifically, in terms of a R-light, lights emitted from a plurality of R LEDs 111 are incident into an R light mixer 710, are uniformly mixed, are transferred to and transferred to a plurality of R optical fibers 810 disposed at the output side of the R light mixer 710. Through a plurality of R optical fibers 810, R-light is transferred into the R optical waveguides 151 disposed in the corresponding compartments. The above-mentioned operating principles apply to a plurality of G LEDs 112, a plurality of G light mixers 720, a plurality of G optical fibers 820, and a plurality of G optical waveguides 152, and a plurality of R LEDs 111, a plurality of R light mixers 710, a plurality of R optical fibers 810, and a plurality of R optical waveguides 151.

Figure 26:
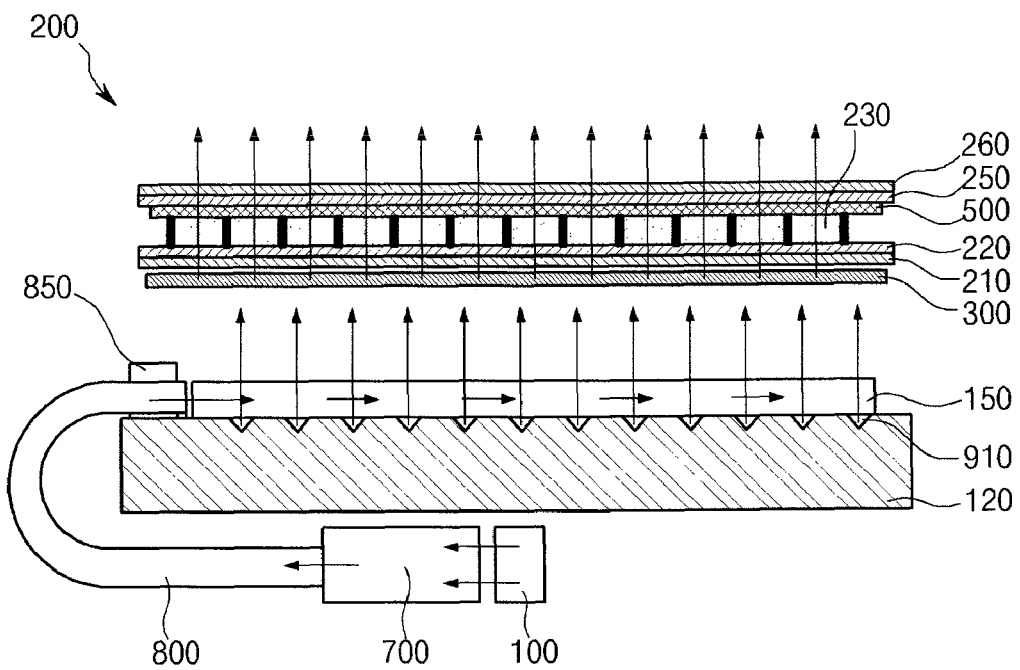
FIG. 26 is a cross-sectional view of an LCD further including a prism light split structure disposed at an optical waveguide of the LCD of FIG. 24.
Figure 27:
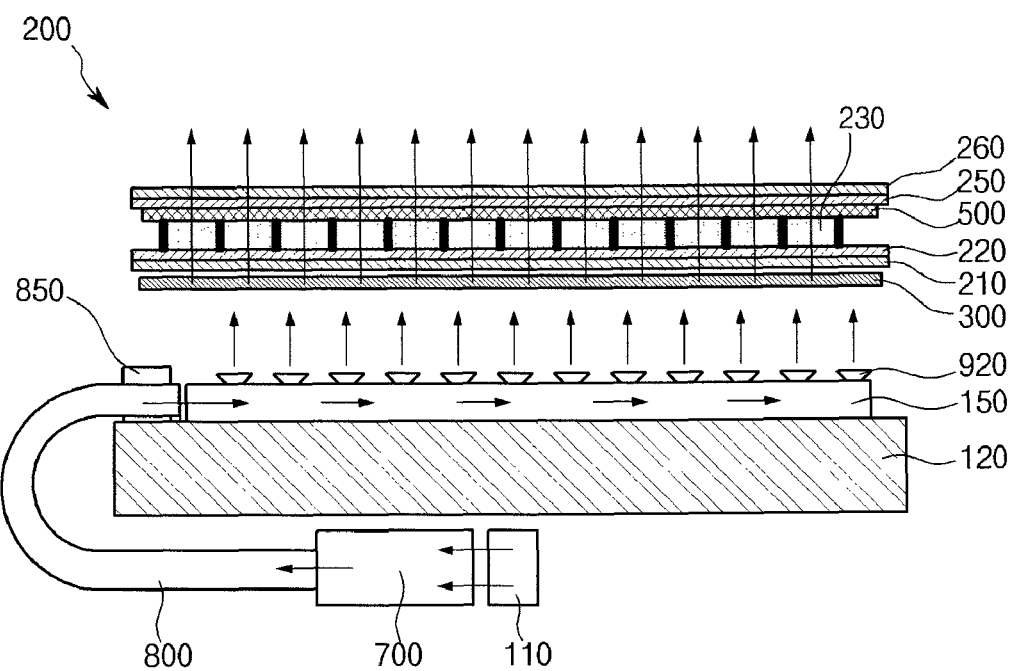
FIG. 27 is a cross-sectional view of an LCD further including inverse prism light split structures disposed at an optical waveguide of the LCD of FIG. 24.
Figure 28:
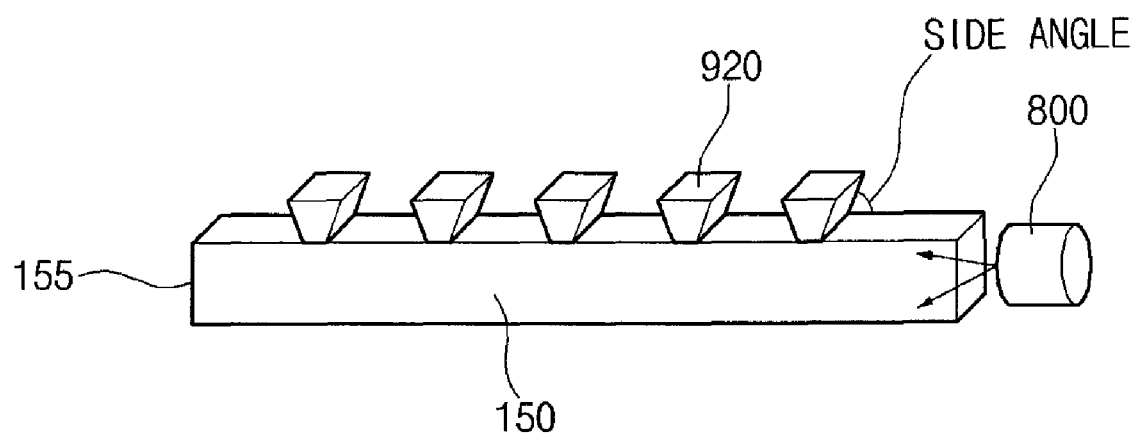
FIG. 28 is a perspective view illustrating the inverse prism light split structure of FIG. 27.

FIG. 26 is a cross-sectional view of an LCD further including a prism light split structure 910 disposed on the optical waveguides of the LCD of FIG. 24, and FIG. 27 is a cross-sectional view of an LCD further including an inverse prism light split structure 920 disposed on the optical waveguides of the LCD of FIG. 24, and FIG. 28 is a perspective view illustrating the inverse prism light split structure 920 of FIG. 27.

The R, G, and B lights guided inside of the R, G, and B optical waveguides 150 due to total internal reflection are split by using a plurality of concave prisms 155 of FIG. 18. Alternatively, as illustrated in FIGS. 26 and 27, the R, G, and B lights guided inside of the R, G, and B optical waveguides 150 due to total internal reflection are split toward the upward direction where the lenticular lens array 300 and the liquid crystal panel 200 are disposed, by using the prism light split structure 910 disposed at the bottom surface of the R, G, and B optical waveguides 150 or by the inverse prism light split structure 920 disposed on the top surface of the R, G, and B optical waveguides 150 and then are incident into the R, G, and B liquid crystal subpixels 230 by the lenticular lens array 300. The R, G, and B LEDs 110 and the R, G, and B light mixers 700 are disposed at the bottom surface of the light source backplane 120. The R, G, and B lights emitted from the R, G, and B light mixers 700 are incident into the R, G, and B optical fibers 800 and are transferred into the R, G, and B optical waveguides 150 positioned at the top surface of the light source backplane 120. As illustrated in FIG. 26, the R, G, and B optical fibers are flexible materials and thus, are connected to the R, G, and B optical waveguides 150 by a fixture 850 and may be positioned at the rear side of the light source backplane 120.

The prism light split structure 910 is disposed at the bottom surface of the R, G, and B optical waveguides 150 of FIG. 26 and splits a portion of the lights guided inside of the R, G, and B optical waveguides 150. In this way, when the backlight unit includes the R, G, and B light mixers 700, the R, G, and B optical waveguides 150 and the R, G, and B optical fibers 800, a difference in properties between light sources such as R, G, and B LEDs and performance change caused by aging effect are greatly reduced, and a stable and excellent image quality can be obtained. Meanwhile, as illustrated in FIG. 27, the inverse prism light split structure 920 having a plurality of inverse prisms and disposed at the top surface of the R, G, and B optical waveguides 150 can split a portion of the lights guided inside of the R, G, and B optical waveguides 150 toward the liquid crystal panel 200. The prism light split structure 910 and the inverse prism light split structure 920 illustrated in FIGS. 26 and 27 are more densely disposed as farther away from a light input side so that intensities of the lights split toward the vertical direction can be uniform. As illustrated in FIG. 28, when the lights guided inside of the R, G, and B optical waveguides 150 are split by the inverse prism light split structure 920, the directions of the split lights may vary according to the side angle. Thus, the optimum side angle is in the range of about 45 to 70 degrees. The end surface 155 of each R, G, and B optical waveguide 150, reflects remaining lights back into each R, G, and B optical waveguide 150 so that light efficiency can be further improved.

As described above, in the LCD without a color filter according to the present invention, firstly, the lenticular lens array is disposed between the liquid crystal panel and the light source backplane such that R, G, and B color filters can be removed from a front glass substrate disposed in front of the R, G, and B liquid crystal subpixels of the LCD. Secondly, the diffusion layer is disposed at an interface between the R, G, and B liquid crystal subpixels and the front glass substrate so that a sufficient viewing angle and white balance can be obtained. Thirdly, transmission efficiency of light is improved up to about 150% (minimum) to 300% (maximum) as compared to the LCD according to the related art so that the number of R, G, and B LEDs, manufacturing costs, and power consumption can be reduced up to about 30% (minimum) to 80% (maximum). Fourthly, a variety of light sheets such as a diffuser plate, a diffuser sheet, a prism sheet, and a reflective polarization sheet used in a backlight unit of the LCD can be removed so that the price of the LCD can be reduced further. Fifthly, when the R, G, and B LEDs and the R, G, and B optical waveguides are used, linearly-polarized lights can be supplied to the lenticular lens array and the liquid crystal panel so that light efficiency can be improved further as compared to the case where unpolarized LED lights are used. Sixthly, R, G, and B CCFLs or EEFLs, which are used in the LCD according to the related art, can be used together. Seventhly, when the backlight unit includes the R, G, and B light mixers, the R, G, and B optical waveguides, and the R, G, and B optical fibers, a difference in properties of light sources and a performance change caused by aging effect do not greatly occur and a stable and excellent image quality can be obtained.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A liquid crystal display without a color filter, the liquid crystal display comprising:
   a liquid crystal panel including front and rear glass substrates and a plurality of red, green, and blue liquid crystal subpixels disposed between the front and rear glass substrates and corresponding to red, green, and blue lights, respectively;
   a backlight unit disposed behind the liquid crystal panel and including a plurality of three-color light supply units supplying the red, green, and blue lights, respectively, and separated from one another so that the plurality of three-color light supply units are compartmentalized; and
   a lenticular lens array disposed between the liquid crystal panel and the backlight unit, guiding the red, green, and blue lights irradiated by the three-color light supply units into the red, green, and blue liquid crystal subpixels included in the liquid crystal panel and including a plurality of lenticular lens groups including a plurality of lenticular lenses, wherein the plurality of lenticular lens groups are separated from one another so that the plurality of lenticular lens groups are compartmentalized to correspond to the three-color light supply units, respectively.

2. The liquid crystal display of claim 1, wherein the three-color light supply units include red, green, and blue light emitting diodes.

3. The liquid crystal display of claim 2, wherein the light emitting diodes are edge emission types and include a plurality of optical waveguides guiding incident lights of the light emitting diodes in a vertical direction due to total internal reflection and converting a current light source type into a linear light source type.

4. The liquid crystal display of claim 3, further including a diffusion layer interposed between the front glass substrate and the R, G, and B liquid crystal subpixels and used to diffuse incident light.

5. The liquid crystal display of claim 3, further including a plurality of prism light split structures disposed at a rear side of the optical waveguides so as to split lights guided inside of the optical waveguides due to total internal reflection toward the vertical direction.

6. The liquid crystal display of claim 3, further including one of a plurality of concave prism light split structures and a plurality of inverse prism light split structures disposed at a front side of the optical waveguides so as to split lights guided inside of the optical waveguides due to total internal reflection toward the vertical direction.

7. The liquid crystal display of claim 2, wherein the light emitting diodes further include one of a circular lens having circular planes and an oval lens having oval planes disposed at the front of the light emitting diodes.

8. The liquid crystal display of claim 7, further including a diffusion layer interposed between the front glass substrate and the R, G, and B liquid crystal subpixels and used to diffuse incident light.

9. The liquid crystal display of claim 2, further including a diffusion layer interposed between the front glass substrate and the R, G, and B liquid crystal subpixels and used to diffuse incident light.

10. The liquid crystal display of claim 1, wherein the backlight unit further includes a plurality of blocking walls disposed between the three-color light supply units so as to compartmentalize each of the three-color light supply units.

11. The liquid crystal display of claim 1, wherein a separation distance g between the adjacent lenticular lens groups is determined by the Equation $$g = 2T_1 \tan \phi_n$$

where $T_1$ is a thickness of the rear glass substrate, and $\phi_n$ is an refraction angle at which light incident into the lenticular lens is refracted by the lenticular lens and proceeds in a vertical, upward direction.

12. The liquid crystal display of claim 1, further including a diffusion layer interposed between the front glass substrate and the R, G, and B liquid crystal subpixels and used to diffuse incident light.

13. The liquid crystal display of claim 12, wherein the diffusion layer is formed of transparent resin in which one of beads and particles are dispersed.

14. The liquid crystal display of claim 13, further including an optical waveguide grid array in which a plurality of optical waveguide grids extending to an inside of the diffusion layer from a rear side of the front glass substrate are arranged at regular intervals, wherein the optical waveguide grid array guides a portion of the light diffused at the diffusion layer due to total internal reflection.

15. The liquid crystal display of claim 14, wherein a refractive index of each of the optical waveguide grids is greater than a refractive index of the diffusion layer.

16. The liquid crystal display of claim 1, wherein the three-color light supply units include one of red, green, and blue cold cathode fluorescence lamps and red, green, and blue external electrode fluorescence lamps.

17. The liquid crystal display of claim 16, wherein a reflective layer is coated at a rear side of one of the cold cathode fluorescence lamps and external electrode fluorescence lamps so that light is emitted from one of the cold cathode fluorescence lamps and external electrode fluorescence lamps only in a front direction.

18. The liquid crystal display of claim 1, wherein the three-color light supply units includes:

three-color light sources supplying red, green, and blue lights by using a plurality of red light sources, a plurality of green light sources, and a plurality of blue light sources;

at least three light mixers mixing the red, green, and blue lights irradiated by the three-color light sources and generating uniform red, green, and blue lights;

at least three optical waveguides guiding the red, green, and blue light generated by the at least three light mixers in a vertical direction due to total internal reflection and converting current light source types into linear light source types; and a plurality of optical fibers through which the red, green, and blue lights generated by the light mixers are respectively transmitted to the said optical waveguides.

19. The liquid crystal display of claim 18, further including a plurality of prism light split structures disposed at a rear side of the optical waveguides so as to split lights guided inside of the optical waveguides due to total internal reflection toward the vertical direction.

20. The liquid crystal display of claim 18, further including one of a plurality of concave prism light split structures and a plurality of inverse prism light split structures disposed at a front side of the optical waveguides so as to split lights guided inside of the optical waveguides due to total internal reflection toward the vertical direction.

* * * * *